United States Patent
Miyoshi

(10) Patent No.: US 11,760,154 B2
(45) Date of Patent: Sep. 19, 2023

(54) IN-VEHICLE TEMPERATURE ADJUSTMENT SYSTEM

(71) Applicant: TOYOTA JIDOSHA KABUSHIKI KAISHA, Aichi-ken (JP)

(72) Inventor: Yuji Miyoshi, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 45 days.

(21) Appl. No.: 17/701,077

(22) Filed: Mar. 22, 2022

(65) Prior Publication Data

US 2022/0371397 A1    Nov. 24, 2022

(30) Foreign Application Priority Data

May 19, 2021    (JP) .................. 2021-084865

(51) Int. Cl.
*B60H 1/00*    (2006.01)
*B60H 1/32*    (2006.01)
(Continued)

(52) U.S. Cl.
CPC ......... *B60H 1/00328* (2013.01); *B60H 1/004* (2013.01); *B60H 1/00007* (2013.01);
(Continued)

(58) Field of Classification Search
CPC ............... B60H 1/00278; B60H 1/004; B60H 1/00899; B60H 1/3227; B60H 1/03; B60H 1/04; B60H 1/143; B60H 1/3223; B60H 2001/00307; B60H 1/00007; B60H 1/00485; B60H 1/00885; B60H 1/3228;
(Continued)

(56) References Cited

U.S. PATENT DOCUMENTS 4,523,437 A * 6/1985 Briley .................. F24F 5/0046
62/238.4
5,228,301 A * 7/1993 Sjoholm ............ B60H 1/00007
62/84
(Continued)

FOREIGN PATENT DOCUMENTS

DE    102020203909 A1 * 10/2020 ......... B60H 1/00278
DE    102020112360 A1 * 11/2020 ......... B60H 1/00271
(Continued)

*Primary Examiner* — Ljiljana V. Ciric
(74) *Attorney, Agent, or Firm* — HAUPTMAN HAM, LLP

(57) ABSTRACT

An in-vehicle temperature adjustment system includes: a refrigeration circuit including an inter-medium heat exchanger and a vaporizer that vaporizes the cooling medium to achieve a refrigeration cycle by circulating a cooling medium; a thermal circuit including a heater core, the inter-medium heat exchanger, an engine thermal circuit, and a radiator to circulate the heating medium; and a controller that controls a distribution state of the heating medium. The thermal circuit includes: a first branch portion at which a coolant flowing out of the engine thermal circuit and the inter-medium heat exchanger is divided into coolants flowing into the heater core and into the radiator; a second branch portion at which a coolant flowing out of the heater core is divided into coolants flowing into the inter-medium heat exchanger and into the engine thermal circuit; a first adjustment valve and a second adjustment valve.

9 Claims, 12 Drawing Sheets

(51) Int. Cl.
  *B60K 11/02*    (2006.01)
  *F01P 7/16*     (2006.01)
  *F01P 3/20*     (2006.01)
  *B60K 1/00*     (2006.01)
  *F01P 5/10*     (2006.01)
  *F01P 7/14*     (2006.01)

(52) U.S. Cl.
  CPC ..... *B60H 1/00278* (2013.01); *B60H 1/00485* (2013.01); *B60H 1/00885* (2013.01); *B60H 1/00899* (2013.01); *B60H 1/3228* (2019.05); *B60H 1/32284* (2019.05); *B60K 11/02* (2013.01); *F01P 3/20* (2013.01); *F01P 7/165* (2013.01); *B60H 2001/00307* (2013.01); *B60K 2001/003* (2013.01); *B60Y 2400/302* (2013.01); *F01P 2005/105* (2013.01); *F01P 2007/146* (2013.01); *F01P 2050/24* (2013.01); *F01P 2060/08* (2013.01); *Y02A 30/274* (2018.01)

(58) Field of Classification Search
  CPC .......... B60H 1/32284; B60K 2001/003; B60K 11/02; B60Y 2400/302; F01P 3/20; F01P 7/165; F01P 2007/146; F01P 2060/08; F01P 2050/24; F01P 2005/105; Y02A 30/274
  See application file for complete search history.

(56) References Cited

U.S. PATENT DOCUMENTS

| | | | | |
|---|---|---|---|---|
| 8,688,322 | B2 * | 4/2014 | Shigyo | B60H 1/3213 454/159 |
| 9,511,647 | B2 * | 12/2016 | Nishikawa | B60H 1/00885 |
| 10,391,834 | B2 * | 8/2019 | Enomoto | F25B 25/005 |
| 10,457,117 | B2 * | 10/2019 | Enomoto | B60H 1/24 |
| 11,180,000 | B2 * | 11/2021 | Aikawa | B60H 1/00899 |
| 11,186,141 | B2 * | 11/2021 | Miyoshi | B60H 1/00278 |
| 11,241,930 | B2 * | 2/2022 | Aikawa | B60H 1/3213 |
| 11,285,782 | B2 * | 3/2022 | Aikawa | B60H 1/3227 |
| 11,358,436 | B2 * | 6/2022 | Aikawa | B60H 1/00392 |
| 11,364,767 | B2 * | 6/2022 | Kitamura | B60H 1/04 |
| 11,413,931 | B2 * | 8/2022 | Yano | B60H 1/00007 |
| 11,498,391 | B2 * | 11/2022 | Shiratori | B60H 1/03 |
| 11,584,258 | B2 * | 2/2023 | Aikawa | B60H 1/00278 |
| 2011/0048671 | A1 * | 3/2011 | Nishikawa | B60H 1/3213 165/42 |
| 2012/0253573 | A1 * | 10/2012 | Shigyo | B60H 1/03 701/22 |
| 2016/0318499 | A1 * | 11/2016 | Yamanaka | B60L 58/27 |
| 2016/0332505 | A1 * | 11/2016 | Yamanaka | B60L 1/003 |
| 2016/0339767 | A1 * | 11/2016 | Enomoto | F25B 25/005 |
| 2017/0368911 | A1 | 12/2017 | Okamoto | |
| 2020/0290426 | A1 * | 9/2020 | Aikawa | B60H 1/00007 |
| 2020/0290431 | A1 * | 9/2020 | Aikawa | B60H 1/3228 |
| 2020/0317026 | A1 | 10/2020 | Kitamura et al. | |
| 2020/0324611 | A1 * | 10/2020 | Yano | B60H 1/32284 |
| 2021/0008951 | A1 * | 1/2021 | Aikawa | B60H 1/3205 |
| 2021/0094390 | A1 * | 4/2021 | Aikawa | B60H 1/3227 |
| 2021/0094443 | A1 * | 4/2021 | Aikawa | B60L 58/26 |
| 2021/0283984 | A1 * | 9/2021 | Miyoshi | B60H 1/00885 |
| 2021/0387506 | A1 * | 12/2021 | Miyoshi | B60H 1/20 |

FOREIGN PATENT DOCUMENTS

| | | | | |
|---|---|---|---|---|
| DE | 102021105464 | A1 * | 9/2021 | ......... B60H 1/00021 |
| EP | 3878670 | A1 * | 9/2021 | ............. B60H 1/00 |
| EP | 4091848 | A1 * | 11/2022 | ......... B60H 1/00007 |
| JP | H1134640 | A  *  | 2/1999 | |
| JP | 2016-130045 | A | 7/2016 | |
| JP | 2020-168950 | A | 10/2020 | |
| JP | 2021054279 | A  *  | 4/2021 | ......... B60H 1/00278 |
| WO | WO-2015174035 | A1 * | 11/2015 | ......... B60H 1/00342 |
| WO | WO-2019026528 | A1 * | 2/2019 | ......... B60H 1/00021 |

* cited by examiner

IN-VEHICLE TEMPERATURE ADJUSTMENT SYSTEM

CROSS-REFERENCE TO RELATED APPLICATION

This application claims priority to Japanese Patent Application No. 2021-084565 filed on May 19, 2021, incorporated herein by reference in its entirety.

BACKGROUND

1. Technical Field

The present disclosure relates to an in-vehicle temperature adjustment system.

2. Description of Related Art

There has hitherto been known an in-vehicle temperature adjustment system that can perform heating in two modes, that is, heating (exhaust heat heating) in which a coolant that flows into a heater core is heated using exhaust heat from an internal combustion engine and heating (heat pump (HP) heating) in which such a coolant is heated using a heat pump (Japanese Unexamined Patent Application Publication No. 2020-168950 (JP 2020-168950 A) and Japanese Unexamined Patent Application Publication No. 2016-130045 (JP 2016-130045 A)).

The in-vehicle temperature adjustment system described in JP 2020-168950 A, in particular, includes a thermal circuit configured such that the coolant is circulated through an inter-medium heat exchanger that exchanges heat with a cooling medium for the heat pump and the heater core. In the in-vehicle temperature adjustment system, in addition, the exit from an engine heat exchanger that exchanges heat with the internal combustion engine is communicated with a flow path of the thermal circuit downstream of the heater core and upstream of the inter-medium heat exchanger and a flow path of the thermal circuit downstream of the inter-medium heat exchanger and upstream of the heater core, and the exit from the engine heat exchanger is selectively communicated with either of the two flow paths by a switching valve.

SUMMARY

The in-vehicle temperature adjustment system described in JP 2020-168950 A is configured such that the exit from the engine heat exchanger is selectively communicated with the upstream side and the downstream side of the heater core, and is complicated.

To perform heating with dehumidification, it is necessary to control the temperature of the coolant that flows into the heat pump to a high level in order to perform heating. Meanwhile, it is necessary to temporarily lower the temperature of air using the heat pump in order to perform dehumidification, and it is necessary to control the temperature of the coolant that flows into the inter-medium heat exchanger to a low level in order to enhance the cooling efficiency of the heat pump.

In view of the foregoing issue, the present disclosure provides an in-vehicle temperature adjustment system with a simple configuration to perform heating with dehumidification appropriately.

An aspect of the present disclosure relates to an in-vehicle temperature adjustment system including a refrigeration circuit, a thermal circuit, and a controller. The refrigeration circuit includes an inter-medium heat exchanger that is configured to radiate heat from a cooling medium to a heating medium to condense the cooling medium and a vaporizer that is configured to cause the cooling medium to absorb heat from air to be supplied to a vehicle cabin to vaporize the cooling medium, the refrigeration circuit being configured to achieve a refrigeration cycle by circulating the cooling medium through the inter-medium heat exchanger and the vaporizer. The thermal circuit includes a heater core that is used to heat the vehicle cabin, the inter-medium heat exchanger, an engine thermal circuit, and a radiator that is configured to radiate heat to outside air to cool the heating medium, the thermal circuit being configured to circulate the heating medium through the heater core, the inter-medium heat exchanger, the engine thermal circuit, and the radiator. The controller is configured to control a state of distribution of the heating medium in the thermal circuit. The engine thermal circuit is configured to distribute the heating medium through an engine heat exchanger that exchanges heat with an internal combustion engine, rather than through the heater core and the inter-medium heat exchanger. The thermal circuit includes a first branch portion, a second branch portion, a first adjustment valve, and a second adjustment valve. The first branch portion includes a merging portion at which the heating medium that has flowed out of the engine thermal circuit and the heating medium that has flowed out of the inter-medium heat exchanger are merged, and the first branch portion is a portion at which the heating medium merged at the merging portion is divided into the heating medium to flow into the heater core and the heating medium to flow into the radiator. The second branch portion includes a portion at which the heating medium that has flowed out of the heater core is divided into the heating medium to flow into the inter-medium heat exchanger and the heating medium to flow into the engine thermal circuit. The first adjustment valve is configured to adjust a proportion of a flow rate of the heating medium that flows from the first branch portion into the heater core and a flow rate of the heating medium that flows from the first branch portion into the radiator. The second adjustment valve is configured to adjust a proportion of a flow rate of the heating medium that flows from the second branch portion into the inter-medium heat exchanger and a flow rate of the heating medium that flows from the second branch portion into the engine thermal circuit. The controller is configured to control the first adjustment valve and the second adjustment valve.

In the in-vehicle temperature adjustment system according to the above aspect, the first adjustment valve may be configured to switch the flow rate in four steps.

In the in-vehicle temperature adjustment system according to the above aspect, the first adjustment valve may be configured to adjust the flow rate in more than four steps or continuously.

In the in-vehicle temperature adjustment system according to the above aspect, the controller may be configured to control the first adjustment valve and the second adjustment valve based on a temperature of the heating medium that flows into the heater core and a temperature of the heating medium that flows into the inter-medium heat exchanger when heating with dehumidification is performed in the vehicle cabin.

In the in-vehicle temperature adjustment system configured as described above, the controller may be configured to control the first adjustment valve such that the heating medium that has flowed into the first branch portion flows into the heater core, rather than flowing into the radiator, when the heating with dehumidification is performed in the vehicle cabin and the temperature of the heating medium that flows into the heater core is less than a predetermined reference temperature. The controller may be configured to control the first adjustment valve such that the heating medium that has flowed into the first branch portion flows into both the heater core and the radiator when the temperature of the heating medium that flows into the heater core is equal to or higher than the reference temperature.

In the in-vehicle temperature adjustment system configured as described above, the controller may be configured to control the second adjustment valve such that the heating medium that has flowed into the second branch portion flows into both the inter-medium heat exchanger and the engine thermal circuit when the heating with dehumidification is performed in the vehicle cabin and the first adjustment valve is controlled such that the heating medium that has flowed into the first branch portion flows into the heater core, rather than flowing into the radiator.

In the in-vehicle temperature adjustment system configured as described above, the controller may be configured to control the second adjustment valve such that a flow rate of the heating medium that flows into the inter-medium heat exchanger is high for a flow rate of the heating medium that flows into the engine thermal circuit when the temperature of the heating medium that flows into the inter-medium heat exchanger is high, compared to when the temperature of the heating medium that flows into the inter-medium heat exchanger is low, when the heating with dehumidification is performed in the vehicle cabin and the first adjustment valve is controlled such that the heating medium that has flowed into the first branch portion flows into the heater core, rather than flowing into the radiator.

In the in-vehicle temperature adjustment system configured as described above, the controller may be configured to control the second adjustment valve such that the heating medium that has flowed into the second branch portion flows into the engine thermal circuit, rather than flowing into the inter-medium heat exchanger, when cooling with dehumidification is performed in the vehicle cabin and the first adjustment valve is controlled such that the heating medium that has flowed into the first branch portion flows into both the heater core and the radiator.

In the in-vehicle temperature adjustment system configured as described above, the controller may be configured to control the first adjustment valve such that the flow rate of the heating medium that flows into the heater core is low for the flow rate of the heating medium that flows into the radiator when the temperature of the heating medium that flows into the inter-medium heat exchanger is high, compared to when the temperature of the heating medium that flows into the inter-medium heat exchanger is low, when the cooling with dehumidification is performed in the vehicle cabin and the first adjustment valve is controlled such that the heating medium that has flowed into the first branch portion flows into both the heater core and the radiator.

With the in-vehicle temperature adjustment system according to the present disclosure, an in-vehicle temperature adjustment system with a simple configuration to perform heating with dehumidification appropriately is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
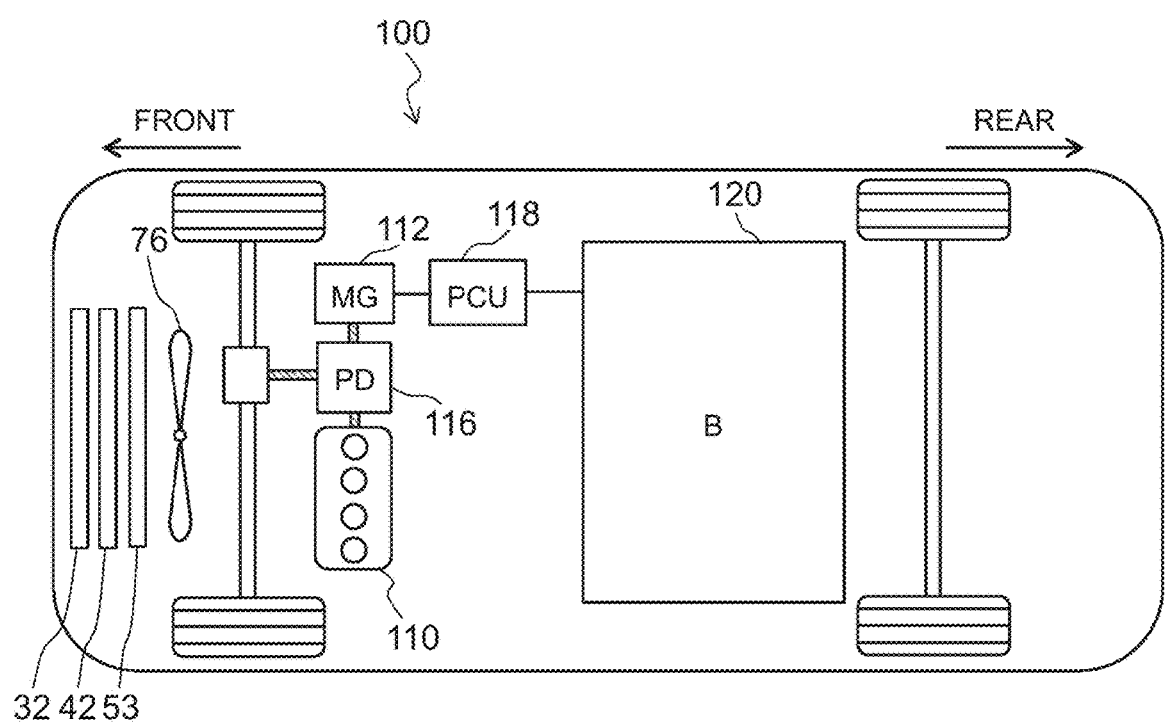
FIG. 1 schematically illustrates the configuration of a vehicle provided with an in-vehicle temperature adjustment system according to an embodiment as an example of the present disclosure.

An embodiment will be described in detail with reference to the drawings. In the following description, like constituent elements are denoted by like reference numerals.

First, the configuration of a vehicle provided with an in-vehicle temperature adjustment system according to an embodiment of the present disclosure will be described. FIG. 1 schematically illustrates the configuration of a vehicle 100 provided with the in-vehicle temperature adjustment system. In FIG. 1, the left side corresponds to the front of the vehicle 100, and the right side corresponds to the rear of the vehicle 100. As illustrated in FIG. 1, the vehicle 100 includes an internal combustion engine 110, a motor generator (MG) 112, and a power division mechanism (PD) 116. The vehicle 100 additionally includes a power control unit (PCU) 118 electrically connected to the MG 112, and a battery 120 electrically connected to the PCU 118.

The internal combustion engine 110 is a motor that burns fuel inside the engine and converts thermal energy of a combustion gas into mechanical energy. The internal combustion engine 110 is connected to the PD 116. An output of the internal combustion engine 110 is used to drive the vehicle 100, and used by the MG 112 to generate power.

The MG 112 functions as an electric motor and an electric generator. The MG 112 is connected to the PD 116, and used to drive the vehicle 100 and regenerate power when braking the vehicle 100. While the MG 112 that has a power generation function is used as a motor that drives the vehicle 100 in the present embodiment, a motor that does not have a power generation function may also be used.

The PCU 118 is connected between the battery 120 and the MG 112 to control electricity to be supplied to the MG 112. The PCU 118 includes heat generation parts such as an inverter that drives the motor, a voltage boosting converter that controls a voltage, and a direct-current (DC)/DC converter that reduces a high voltage. The battery 120 is connected to the PCU 118 and the MG 112 to supply electricity for driving the vehicle 100 to the MG 112.

In the present embodiment, the internal combustion engine 110, the MG 112, and the PCU 118 are disposed in a front part of the vehicle 100, that is, in front of a vehicle cabin. On the other hand, the battery 120 is disposed at the middle of the vehicle 100, that is, under the vehicle cabin.

The vehicle 100 may be a vehicle of any type that includes the internal combustion engine 110 and the MG (or motor) 112. Thus, the vehicle 100 may be configured such that only the internal combustion engine is used to generate power and only the motor is used to drive the vehicle 100, for example. Alternatively, the vehicle 100 may be configured to include two MGs, namely an MG that is mainly used to drive the vehicle 100 and an MG that is mainly used to generate power, for example.

Figure 2:
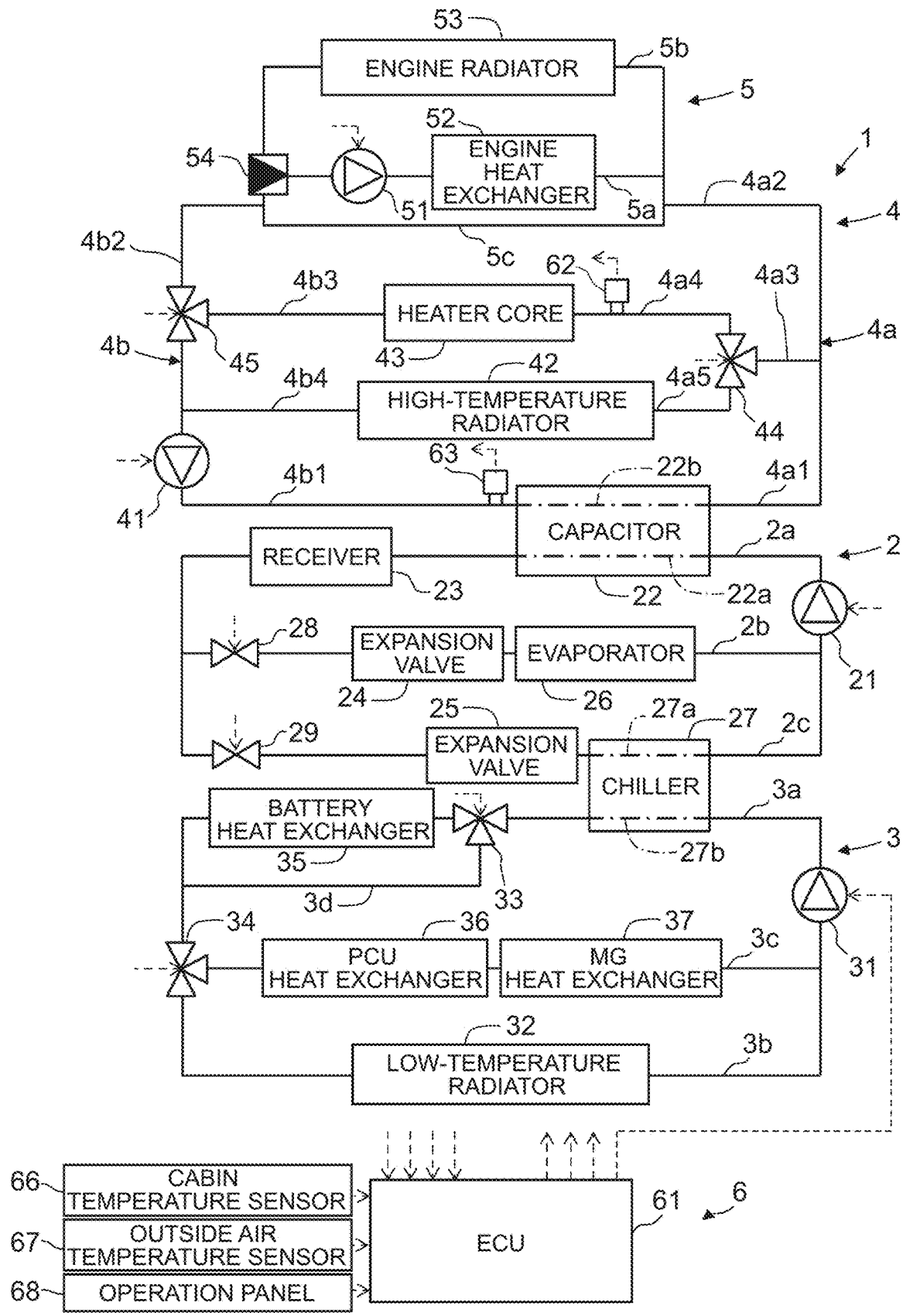
FIG. 2 is a diagram schematically illustrating the in-vehicle temperature adjustment system according to the embodiment.

Next, the configuration of the in-vehicle temperature adjustment system will be described. The configuration of an in-vehicle temperature adjustment system according to an embodiment will be described with reference to FIGS. 1 to 3D. FIG. 2 is a diagram schematically illustrating the in-vehicle temperature adjustment system. The in-vehicle temperature adjustment system includes a refrigeration circuit 2, a low-temperature circuit 3, a high-temperature circuit 4, and a controller 6. The refrigeration circuit 2, the low-temperature circuit 3, and the high-temperature circuit 4 function as a thermal circuit that exchanges heat with the outside of the circuit.

First, the refrigeration circuit 2 will be described. The refrigeration circuit 2 includes a compressor 21, cooling medium piping 22a of a condenser 22, a receiver 23, a first expansion valve 24, a second expansion valve 25, an evaporator 26, cooling medium piping 27a of a chiller 27 that is a device that controls the temperature of a device by circulating a liquid, a first electromagnetic adjustment valve 28, and a second electromagnetic adjustment valve 29. The refrigeration circuit 2 is configured to achieve a refrigeration cycle by a cooling medium circulating through these constituent parts. The cooling medium may be any material that is commonly used as a cooling medium in a refrigeration cycle, such as hydrofluorocarbon (e.g. HFC-134a), for example. The condenser 22 is an example of the "inter-medium heat exchanger" according to the present disclosure.

The refrigeration circuit 2 also includes a refrigeration basic flow path 2a, an evaporator flow path 2b, and a chiller flow path 2c. The evaporator flow path 2b and the chiller flow path 2c are provided in parallel with each other, and are each connected to the refrigeration basic flow path 2a.

The refrigeration basic flow path 2a is provided with the compressor 21, the cooling medium piping 22a of the condenser 22, and the receiver 23 that are provided in this order in the direction of circulation of the cooling medium. The evaporator flow path 2b is provided with the first electromagnetic adjustment valve 28, the first expansion valve 24, and the evaporator 26 that are provided in this order in the direction of circulation of the cooling medium. The chiller flow path 2c is provided with the second electromagnetic adjustment valve 29, the second expansion valve 25, and the cooling medium piping 27a of the chiller 27 that are provided in this order.

The compressor 21 functions as a compressor that compresses the cooling medium. In the present embodiment, the compressor 21 is electrically driven, and configured such that the discharge capacity of the compressor 21 is continuously varied by adjusting electricity to be supplied to the compressor 21. In the compressor 21, the cooling medium mainly in a gaseous form and at a low temperature and a low pressure that has flowed out of the evaporator 26 or the chiller 27 is compressed adiabatically to be varied into a cooling medium mainly in a gaseous form and at a high temperature and a high pressure.

The condenser 22 includes the cooling medium piping 22a and coolant piping 22b. The condenser 22 functions as an inter-medium heat exchanger that radiates heat from the cooling medium to a coolant that flows through the coolant piping 22b of the high-temperature circuit 4, to be discussed later, to condense the cooling medium. When seen from a different viewpoint, the condenser 22 functions as a heating portion that heats the coolant in the high-temperature circuit 4 using heat other than exhaust heat from the internal combustion engine 110. The cooling medium piping 22a of the condenser 22 functions as a condenser that condenses the cooling medium in the refrigeration cycle. In the cooling medium piping 22a of the condenser 22, the cooling medium mainly in a gaseous form at a high temperature and a high pressure that has flowed out of the compressor 21 is cooled isobarically to be varied into a cooling medium mainly in a liquid form at a high temperature and a high pressure.

The receiver 23 stores the cooling medium condensed by the cooling medium piping 22a of the condenser 22. The receiver 23 is configured to separate a gas and a liquid, since the condenser 22 cannot necessarily liquefy all the cooling medium. Only a cooling medium in a liquid form from which a cooling medium in a gaseous form has been separated flows out of the receiver 23.

The first expansion valve 24 and the second expansion valve 25 function as an expansion unit that expands the cooling medium. The expansion valves 24 and 25 include a passage with a small diameter, and abruptly lower the pressure of the cooling medium by spraying the cooling medium from the passage with a small diameter. The first expansion valve 24 sprays the cooling medium in a liquid form supplied from the receiver 23 into the evaporator 26 in a spray form. Likewise, the second expansion valve 25 sprays the cooling medium in a liquid form supplied from the receiver 23 into the cooling medium piping 27a of the chiller 27 in a spray form. In the expansion valves 24 and 25, the cooling medium in a liquid form at a high temperature and a high pressure that has flowed out of the receiver 23 is depressurized and partially vaporized to be varied into a cooling medium in a spray form at a low temperature and a low pressure.

The evaporator 26 functions as a vaporizer that vaporizes the cooling medium by causing the cooling medium to absorb heat. Specifically, the evaporator 26 vaporizes the cooling medium by causing the cooling medium to absorb heat from air around the evaporator 26. Thus, the evaporator 26 vaporizes the cooling medium in a spray form at a low temperature and a low pressure that has flowed out of the first expansion valve 24 to be varied into a cooling medium in a gaseous form at a low temperature and a low pressure. As a result, air around the evaporator 26 can be cooled to cool the vehicle cabin.

The chiller 27 includes the cooling medium piping 27a and coolant piping 27b. The chiller 27 functions as an inter-medium heat exchanger that vaporizes the cooling medium by causing the cooling medium to absorb heat from the coolant that flows through the coolant piping 27b of the low-temperature circuit 3 to be discussed later. The cooling medium piping 27a of the chiller 27 functions as a vaporizer that vaporizes the cooling medium. In the cooling medium piping 27a of the chiller 27, the cooling medium in a spray form at a low temperature and a low pressure that has flowed out of the second expansion valve 25 is vaporized to be varied into a cooling medium in a gaseous form at a low temperature and a low pressure. As a result, the coolant in the low-temperature circuit 3 is cooled.

The first electromagnetic adjustment valve 28 and the second electromagnetic adjustment valve 29 are used to change the manner of distribution of the cooling medium in the refrigeration circuit 2. As the opening degree of the first electromagnetic adjustment valve 28 becomes larger, a larger amount of the cooling medium flows into the evaporator flow path 2b, and hence a larger amount of the cooling medium flows into the evaporator 26. Meanwhile, as the opening degree of the second electromagnetic adjustment valve 29 becomes larger, a larger amount of the cooling medium flows into the chiller flow path 2c, and hence a larger amount of the cooling medium flows into the chiller 27. Any valve may be provided in place of the electromagnetic adjustment valves 28 and 29 when the flow rate of the cooling medium that flows from the refrigeration basic flow path 2a into the evaporator flow path 2b and the chiller flow path 2c can be adjusted.

In the present embodiment, the refrigeration circuit 2 includes only the condenser 22 as a heat exchanger that radiates heat from the cooling medium in the refrigeration circuit 2 to the outside. However, the refrigeration circuit 2 may include a different heat exchanger that radiates heat from the cooling medium to the outside (e.g. outside air).

Next, the low-temperature circuit 3 will be described. The low-temperature circuit 3 includes a first pump 31, the coolant piping 27b of the chiller 27, a low-temperature radiator 32, a first three-way valve 33, and a second three-way valve 34. The low-temperature circuit 3 additionally includes a battery heat exchanger 35, a PCU heat exchanger 36, and an MG heat exchanger 37. In the low-temperature circuit 3, the coolant is circulated through these constituent parts. The coolant is an example of the second heating medium, and any other heating medium may be used in place of the coolant in the low-temperature circuit 3.

The low-temperature circuit 3 includes a low-temperature basic flow path 3a, a low-temperature radiator flow path 3b, and a heat generation device flow path 3c. The low-temperature radiator flow path 3b and the heat generation device flow path 3c are provided in parallel with each other, and are each connected to the low-temperature basic flow path 3a.

The low-temperature basic flow path 3a is provided with the first pump 31, the coolant piping 27b of the chiller 27, and the battery heat exchanger 35 that are provided in this order in the direction of circulation of the coolant. A battery bypass flow path 3d provided so as to bypass the battery heat exchanger 35 is connected to the low-temperature basic flow path 3a. The first three-way valve 33 is provided at a portion of connection between the low-temperature basic flow path 3a and the battery bypass flow path 3d.

Further, the low-temperature radiator 32 is provided in the low-temperature radiator flow path 3b. The heat generation device flow path 3c is provided with the PCU heat exchanger 36 and the MG heat exchanger 37 that are provided in this order in the direction of circulation of the coolant. The heat generation device flow path 3c may be provided with a heat exchanger that exchanges heat with a heat generation device other than the PCU and the MG. The second three-way valve 34 is provided between the low-temperature basic flow path 3a and the low-temperature radiator flow path 3b and the heat generation device flow path 3c.

The first pump 31 pumps the coolant circulated in the low-temperature circuit 3. In the present embodiment, the first pump 31 is an electric water pump, and is configured such that the discharge capacity of the first pump 31 is continuously varied by adjusting electricity to be supplied to the first pump 31.

The low-temperature radiator 32 is a heat exchanger that exchanges heat between the coolant circulated in the low-temperature circuit 3 and air (outside air) outside the vehicle 100. The low-temperature radiator 32 is configured to radiate heat from the coolant to the outside air when the temperature of the coolant is higher than the temperature of the outside air, and to absorb heat from the outside air to the coolant when the temperature of the coolant is lower than the temperature of the outside air.

The first three-way valve 33 is configured to selectively distribute the coolant that has flowed out of the coolant piping 27b of the chiller 27 between the battery heat exchanger 35 and the battery bypass flow path 3d. The second three-way valve 34 is configured to selectively distribute the coolant that has flowed out of the low-temperature basic flow path 3a between the low-temperature radiator flow path 3b and the heat generation device flow path 3c.

The battery heat exchanger 35 is configured to exchange heat with the battery 120 of the vehicle 100. The PCU heat exchanger 36 is configured to exchange heart with the PCU 118 of the vehicle 100. The MG heat exchanger 37 is configured to exchange heat with the MG 112 of the vehicle 100.

In the present embodiment, the chiller 27 is provided in the refrigeration circuit 2 and the low-temperature circuit 3, and the chiller 27 functions as an inter-medium heat exchanger that transfers heat from the coolant in the low-temperature circuit 3 to the cooling medium in the refrigeration circuit 2. However, the refrigeration circuit 2 may be provided with a heat exchanger that exchanges heat with a gas in the atmosphere outside the vehicle to transfer heat from the gas in the atmosphere to the cooling medium in the refrigeration circuit 2, in place of the chiller 27. In this case, the in-vehicle temperature adjustment system is not provided with the low-temperature circuit 3, and hence the battery 120, the PCU 118, and the MG 112 are cooled by a mechanism other than the in-vehicle temperature adjustment system.

Next, the high-temperature circuit 4 will be described. The high-temperature circuit 4 includes a second pump 41, the coolant piping 22b of the condenser 22, a high-temperature radiator 42, a heater core 43, a third three-way valve 44, a fourth three-way valve 45, and an engine thermal circuit 5. Also in the high-temperature circuit 4, the coolant is circulated through these constituent parts. The coolant is an example of the first heating medium, and any other heating medium may be used in place of the coolant in the high-temperature circuit 4. The high-temperature radiator 42 is an example of the "radiator" according to the present disclosure. The third three-way valve 44 is an example of the "first adjustment valve" according to the present disclosure. The fourth three-way valve 45 is an example of the "second adjustment valve" according to the present disclosure.

Further, the high-temperature circuit 4 includes a first communication path 4a and a second communication path 4b.

The first communication path 4a communicates with a portion of the engine thermal circuit 5 downstream of an engine heat exchanger 52, to be discussed later, and the exit from the coolant piping 22b of the condenser 22, and communicates with the entrance to the heater core 43 and the entrance to the high-temperature radiator 42. Specifically, the first communication path 4a includes a condenser flow-out passage 4a1 that communicates with the exit from the coolant piping 22b of the condenser 22, an engine flow-out passage 4a2 that communicates with the engine thermal circuit 5, a merging passage 4a3 that communicates with a merging portion at which the condenser flow-out passage 4a1 and the engine flow-out passage 4a2 are merged, and a core flow-in passage 4a4 and a radiator flow-in passage 4a5 branched from the merging passage 4a3. The core flow-in passage 4a4 communicates with the entrance to the heater core 43. The radiator flow-in passage 4a5 communicates with the entrance to the high-temperature radiator 42.

Thus, the first communication path 4a can cause the coolant that has flowed out of the engine thermal circuit 5 and the coolant that has flowed out of the condenser 22 to flow into the heater core 43 and/or the high-temperature radiator 42. Specifically, the coolant that has flowed out of the condenser 22 and the coolant that has flowed out of the engine thermal circuit 5 are merged at the merging portion between the condenser flow-out passage 4a1 and the engine flow-out passage 4a2, and flow into the merging passage 4a3. Then, the coolant that has flowed through the merging passage 4a3 is divided into the coolant to flow into the heater core 43 and the coolant to flow into the high-temperature radiator 42 at the branch portion at which the merging passage 4a3 is branched into the core flow-in passage 4a4 and the radiator flow-in passage 4a5.

The second communication path 4b communicates with the exit from the heater core 43 and the exit from the high-temperature radiator 42, and communicates with a portion of the engine thermal circuit 5 upstream of the engine heat exchanger 52 and the entrance to the coolant piping 22b of the condenser 22. Specifically, the second communication path 4b includes a condenser flow-in passage 4b1 that communicates with the entrance to the coolant piping 22b of the condenser 22, an engine flow-in passage 4b2 that communicates with the engine thermal circuit 5, a core flow-out passage 4b3 that communicates with the condenser flow-in passage 4b1 and the engine flow-in passage 4b2 and that communicates with the exit from the heater core 43, and a radiator flow-out passage 4b4 that communicates with the exit from the high-temperature radiator 42 and the condenser flow-in passage 4b1.

Thus, the second communication path 4b can cause the coolant that has flowed out of the heater core 43 and the coolant that has flowed out of the high-temperature radiator 42 into the engine thermal circuit 5 and/or the condenser 22. Specifically, the coolant that has flowed through the core flow-out passage 4b3 is divided into the coolant to flow into the condenser 22 and the coolant to flow into the engine thermal circuit 5 at the branch portion at which the core flow-out passage 4b3 is branched into the condenser flow-in passage 4b1 and the engine flow-in passage 4b2. All the coolant that has flowed through the radiator flow-out passage 4b4 flows into the condenser 22 via the condenser flow-in passage 4b1.

In the present embodiment, from the above, the high-temperature circuit 4 includes the first communication path 4a and the second communication path 4b. The first communication path 4a is a path that communicates with a portion of the engine thermal circuit 5 downstream of the engine heat exchanger 52, the exit from the condenser 22, the entrance to the heater core 43, and the entrance to the high-temperature radiator 42 to distribute the coolant from the engine thermal circuit 5 and/or the condenser 22 to the heater core 43 and/or the high-temperature radiator 42. The second communication path 4b is a path that communicates with a portion of the engine thermal circuit 5 upstream of the engine heat exchanger 52, the entrance to the condenser 22, the exit from the heater core 43, and the exit from the high-temperature radiator 42 to distribute the coolant from the heater core 43 and/or the high-temperature radiator 42 to the engine thermal circuit 5 and/or the condenser 22.

The second pump 41 pumps the coolant circulated in the high-temperature circuit 4. In the present embodiment, the second pump 41 is an electric water pump that is similar to the first pump 31. In the present embodiment, in particular, the second pump 41 is provided in the condenser flow-in passage 4b1. The high-temperature radiator 42 is a heat exchanger that exchanges heat between the coolant circulated in the high-temperature circuit 4 and the outside air, as with the low-temperature radiator 32.

The heater core 43 is used to heat the vehicle cabin using heat of the coolant in the high-temperature circuit 4. That is, the heater core 43 is configured to warm air around the heater core 43 by exchanging heat between the coolant circulated in the high-temperature circuit 4 and the air around the heater core 43 and, as a result, warm the vehicle cabin. Specifically, the heater core 43 is configured to discharge heat from the coolant to the air around the heater core 43. Thus, when a coolant at a high temperature flows through the heater core 43, the temperature of the coolant is lowered, and the air around the heater core 43 is warmed.

The third three-way valve 44 is provided at the branch portion at which the merging passage 4a3 is branched into the core flow-in passage 4a4 and the radiator flow-in passage 4a5. Thus, coolants that have flowed out of the condenser 22 and the engine thermal circuit 5 to be merged at the merging passage 4a3 flow into the third three-way valve 44.

FIGS. 3A to 3D schematically illustrate different operation states of the third three-way valve 44. As illustrated in FIGS. 3A to 3D, the third three-way valve 44 includes a housing 44a and a valve element 44h that is turned in the housing 44a. The housing 44a includes an entrance X that communicates with the merging passage 4a3, a first exit Y that communicates with the core flow-in passage 4a4, and a second exit Z that communicates with the radiator flow-in passage 4a5. The state of communication among the entrance X, the first exit Y, and the second exit Z is changed by turning the valve element 44b in the housing 44a.

Figure 3A:
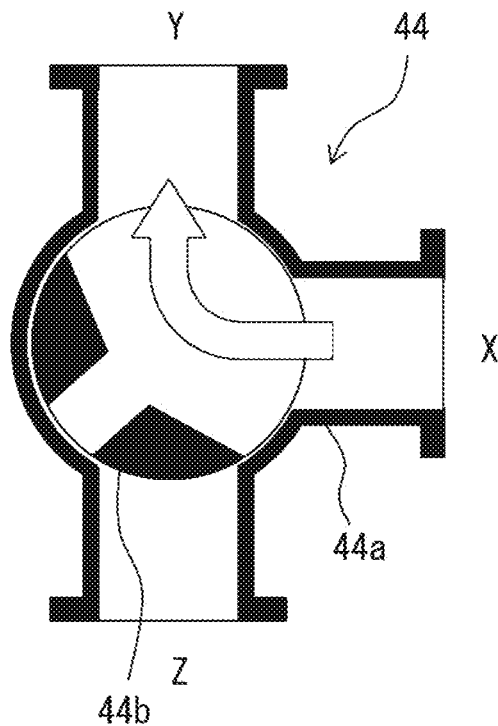
FIG. 3A schematically illustrates different operation states of a fourth three-way valve illustrated in FIG. 2.

When the valve element 44b of the third three-way valve 44 is in a first state illustrated in FIG. 3A, the entrance X is communicated with the first exit Y. Thus, in this case, all the coolant that has flowed into the third three-way valve 44 (i.e. the coolant that has flowed in from the merging passage 4a3) flows into the heater core 43 through the core flow-in passage 4a4.

Figure 3B:
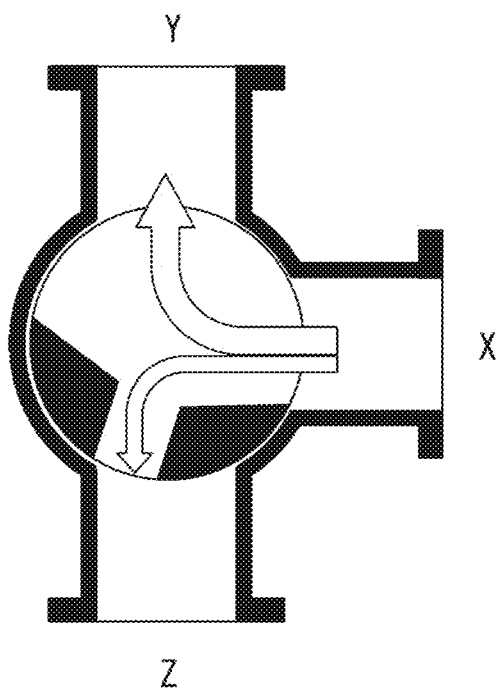
FIG. 3B schematically illustrates different operation states of a fourth three-way valve illustrated in FIG. 2.

When the third three-way valve 44 is in a second state illustrated in FIG. 3B, the entrance X is communicated with both the first exit and the second exit Z. However, the opening area of a passage from the entrance X to the first exit Y is larger than the opening area of a passage from the entrance X to the second exit Z. Thus, in this case, the coolant that has flowed into the third three-way valve 44 flows into both the core flow-in passage 4a4 and the radiator flow-in passage 4a5, and the proportion of the coolant that flows into the core flow-in passage 4a4 is larger than the proportion of the coolant that flows into the radiator flow-in passage 4a5.

Figure 3C:
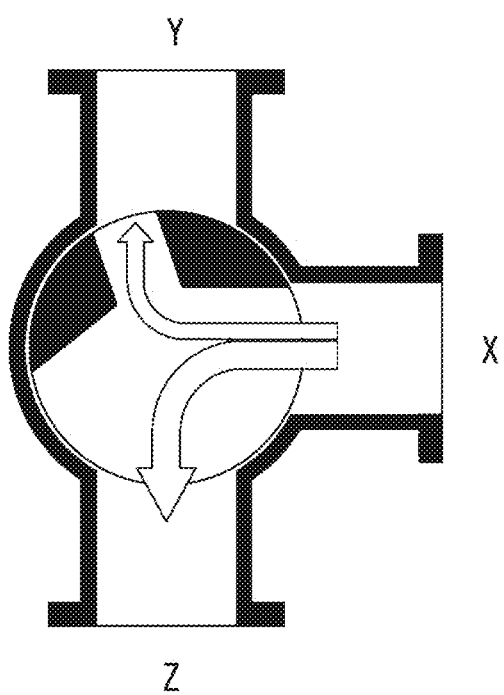
FIG. 3C schematically illustrates different operation states of a fourth three-way valve illustrated in FIG. 2.

When the third three-way valve 44 is in a third state illustrated in FIG. 3C, the entrance X is communicated with both the first exit and the second exit Z. In the third state, however, the opening area of a passage from the entrance X to the second exit Z is larger than the opening area of a passage from the entrance X to the first exit Y. Thus, in this case, the coolant that has flowed into the third three-way valve 44 flows into both the core flow-in passage 4a4 and the radiator flow-in passage 4a5, and the proportion of the coolant that flows into the radiator flow-in passage 4a5 is larger than the proportion of the coolant that flows into the core flow-in passage 4a4.

Figure 3D:
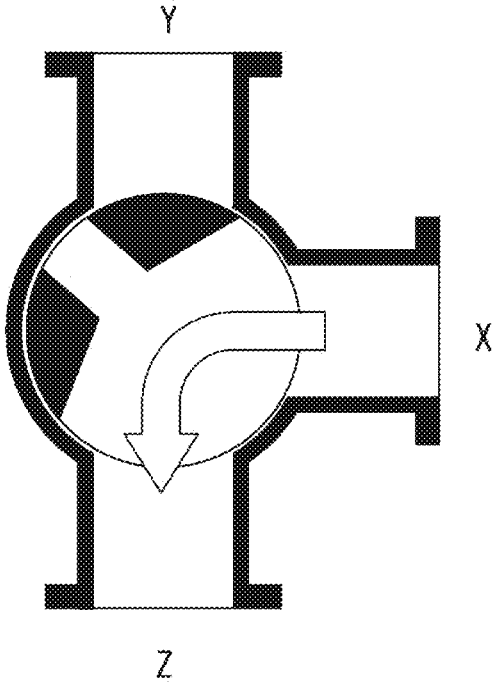
FIG. 3D schematically illustrates different operation states of a fourth three-way valve illustrated in FIG. 2.

When the valve element 44b of the third three-way valve 44 is in a fourth state illustrated in FIG. 3D, the entrance X is communicated with the second exit Z. Thus, in this case, all the coolant that has flowed into the third three-way valve 44 flows into the high-temperature radiator 42 through the radiator flow-in passage 4a5.

In the present embodiment, as described above, the third three-way valve 44 functions as an adjustment valve that adjusts the proportion of the flow rate of the coolant that flows into the core flow-in passage 4a4 (i.e. into the heater core 43) from the branch portion of the merging passage 4a3 and the flow rate of the coolant that flows into the radiator flow-in passage 4a5 (i.e. into the high-temperature radiator 42) from the branch portion of the merging passage 4a3.

The third three-way valve 44 may be an adjustment valve that adjusts the proportion of the flow rate of coolants that flow into the heater core 43 and the high-temperature radiator 42 in more than the four steps illustrated in FIGS. 3A to 3D, or may be an adjustment valve that continuously adjusts such proportion. Alternatively, two electromagnetic adjustment valves may be provided in the core flow-in passage 4a4 and the radiator flow-in passage 4a5, respectively, in place of the third three-way valve 44, and used as adjustment valves that adjust the proportion of the flow rate of coolants that flow into the heater core 43 and the high-temperature radiator 42 stepwise or continuously.

The fourth three-way valve 45 is provided at a branch portion at which the core flow-out passage 4b3 is branched into the condenser flow-in passage 4b1 and the engine flow-in passage 4b2. Thus, the coolant that has flowed out of the heater core 43 to the core flow-out passage 4b3 flows into the fourth three-way valve 45.

Further, the fourth three-way valve 45 is configured similarly to the third three-way valve 44. The entrance X of the fourth three-way valve 45 communicates with the core flow-out passage 4b3. The first exit Y communicates with the engine flow-in passage 4b2. The second exit Z communicates with the condenser flow-in passage 4b1. Thus, the fourth three-way valve 45 functions as an adjustment valve that adjusts the proportion of the flow rate of the coolant that flows into the condenser flow-in passage 4b1 (i.e. into the condenser 22) from the branch portion of the core flow-out passage 4b3 and the flow rate of the coolant that flows into the engine flow-in passage 4b2 (i.e. into the engine thermal circuit 5) from the branch portion of the core flow-out passage 4b3. The fourth three-way valve 45 may be replaced with another adjustment valve that can adjust the proportion of the flow rate of coolants that flow into the condenser 22 and the engine thermal circuit 5 stepwise or continuously.

Next, the engine thermal circuit 5 will be described. The engine thermal circuit 5 is a thermal circuit that is used to radiate heat generated by the internal combustion engine 110. The engine thermal circuit 5 includes a third pump 51, an engine heat exchanger 52, an engine radiator 53, and a thermostat 54. In the engine thermal circuit 5, the same coolant as the high-temperature circuit 4 is circulated through these constituent parts. Thus, the engine thermal circuit 5 distributes the coolant through the engine heat exchanger 52, rather than through the coolant piping 22b of the condenser 22, the high-temperature radiator 42, and the heater core 43.

Further, the engine thermal circuit 5 is divided into an engine basic flow path 5a, an engine radiator flow path 5b, and an engine bypass flow path 5c, The engine radiator flow path 5b and the engine bypass flow path 5c are provided in parallel with each other, and are each connected to the engine basic flow path 5a.

The engine basic flow path 5a is provided with the third pump 51 and the engine heat exchanger 52 that are provided in this order in the direction of circulation of the coolant. The engine radiator flow path 5b is provided with the engine radiator 53. Further, the engine bypass flow path 5c communicates with the engine flow-out passage 4a2 and the engine flow-in passage 4b2. In particular, the engine flow-out passage 4a2 communicates with an upstream portion of the engine bypass flow path 5c. As a result, the engine flow-out passage 4a2 communicates with the vicinity of the exit from the engine heat exchanger 52. On the other hand, the engine flow-in passage 4b2 communicates with a downstream portion of the engine bypass flow path 5c. As a result, the engine flow-in passage 4b2 communicates with the vicinity of the entrance to the engine heat exchanger 52. Thus, the engine heat exchanger 52 is configured to communicate with the high-temperature circuit 4 such that the coolant in the high-temperature circuit 4 is distributed to the engine heat exchanger 52. The thermostat 54 is provided between the engine basic flow path 5a and the engine radiator flow path 5b and the engine bypass flow path 5c. While the engine flow-out passage 4a2 communicates with the engine bypass flow path 5c in the example illustrated in FIG. 2, the engine flow-out passage 4a2 may communicate with the engine basic flow path 5a, etc.

The third pump 51 pumps the coolant circulated in the engine thermal circuit 5. In the present embodiment, the third pump 51 is an electric water pump that is similar to the first pump 31. Further, the engine radiator 53 is a heat exchanger that exchanges heat between the coolant circulated in the engine thermal circuit 5 and the outside air, as with the low-temperature radiator 32.

The engine heat exchanger 52 is used to heat the coolant using exhaust heat from the internal combustion engine 110. That is, the engine heat exchanger 52 discharges heat from the internal combustion engine 110 to the coolant in the engine thermal circuit 5 to heat the coolant. The engine heat exchanger 52 suppresses the internal combustion engine 110 being excessively heated, by discharging heat generated along with combustion of fuel in the internal combustion engine 110 to the coolant. The engine heat exchanger 52 is constituted from a coolant passage provided in a cylinder block and a cylinder head of the internal combustion engine 110, for example.

The thermostat 54 is a valve that is switched between a closed state in which the flow of the coolant through the engine radiator flow path 5b is blocked, and an open state in which the flow of the coolant through the engine radiator flow path 5b is allowed. The thermostat 54 is opened so as to cause the coolant to flow through the engine radiator flow path 5b when the temperature of the coolant circulated through the engine bypass flow path 5c is equal to or more than a temperature set in advance. On the other hand, the thermostat 54 is closed so as not to cause the coolant to flow through the engine radiator flow path 5b when the temperature of the coolant circulated through the engine bypass flow path 5c is less than the temperature set in advance. As a result, the temperature of the coolant distributed to the engine heat exchanger 52 is kept substantially constant.

Figure 4:
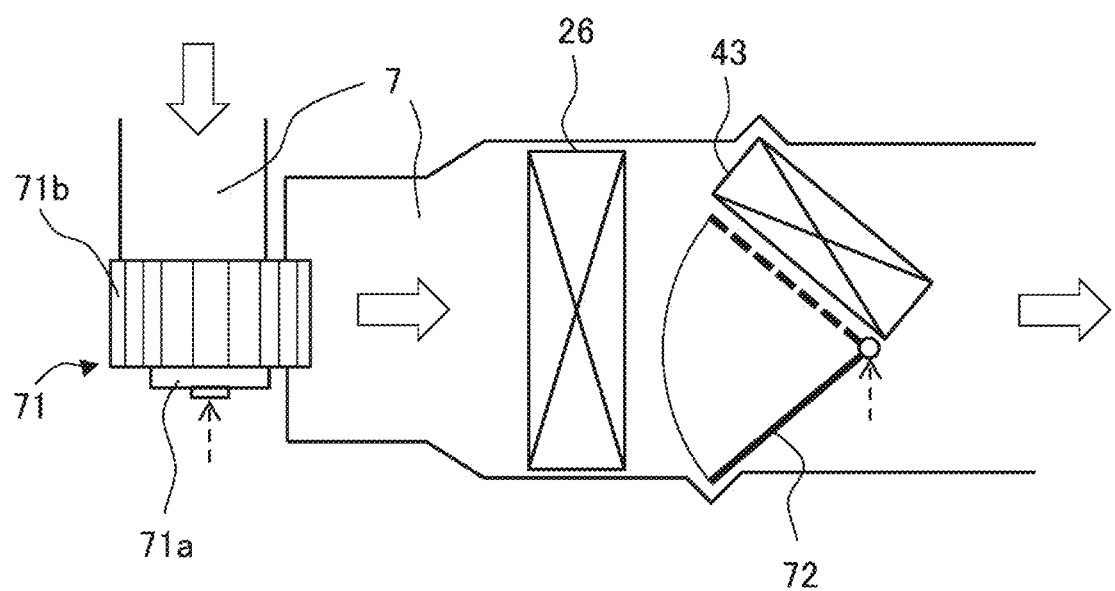
FIG. 4 is a diagram schematically illustrating an air passage for air conditioning of the vehicle provided with the in-vehicle temperature adjustment system.

Next, an air passage will be described. FIG. 4 is a diagram schematically illustrating an air passage 7 for air conditioning of the vehicle 100 provided with the in-vehicle temperature adjustment system. In the air passage 7, air flows in the direction indicated by the arrow in the drawing. The air passage 7 illustrated in FIG. 4 is connected to an air intake port outside the vehicle 100 or in the vehicle cabin. The outside air or the air in the vehicle cabin flows into the air passage 7 in accordance with the state of control by the controller 6. The air passage 7 illustrated in FIG. 4 is also connected to a plurality of blowout ports that blow out air into the vehicle cabin. Air is supplied from the air passage 7 to any of the blowout ports in accordance with the state of control by the controller 6.

As illustrated in FIG. 4, the air passage 7 for air conditioning according to the present embodiment is provided with a blower 71, the evaporator 26, an air mix door 72, and the heater core 43 that are provided in this order in the air flow direction.

The blower 71 includes a blower motor 71a and a blower fan 71b. The blower 71 is configured such that air flows through the air passage 7 with outside air or air in the vehicle cabin flowing into the air passage 7 when the blower fan 71b is driven by the blower motor 71a. The blower fan 71b is basically driven when heating or cooling of the vehicle cabin is requested.

The air mix door 72 adjusts the flow rate of air that flows through the heater core 43, of the air that flows through the air passage 7. The air mix door 72 is configured so as to allow adjustment among a state in which all the air that flows through the air passage 7 flows through the heater core 43, a state in which any of the air that flows through the air passage 7 does not flow through the heater core 43, and a state therebetween.

In the thus configured air passage 7, the air flowing through the air passage 7 is cooled when the cooling medium is circulated through the evaporator 26 when the blower 71 is driven. Meanwhile, the air flowing through the air passage 7 is warmed when the coolant is circulated through the heater core 43 and the air mix door 72 is controlled such that air flows through the heater core 43 when the blower 71 is driven.

As illustrated in FIG. 1, the low-temperature radiator 32, the high-temperature radiator 42, and the engine radiator 53 are disposed inside the front grille of the vehicle 100. Thus, running air hits the radiators 32, 42, and 53 when the vehicle 100 is traveling. Further, a fan 76 is provided adjacent to the radiators 32, 42, and 53. The fan 76 is configured to blow air toward the radiators 32, 42, and 53 when the fan 76 is driven. Thus, air can be blown toward the radiators 32, 42, and 53 by driving the fan 76, even when the vehicle 100 is not traveling.

Next, the controller will be described. As illustrated in FIG. 2, the controller 6 includes an electronic control unit (ECU) 61. The ECU 61 includes a processor that performs various computations, a memory that stores programs and various information, and an interface connected to various actuators and various sensors.

The controller 6 also includes a first coolant temperature sensor 62 provided in the core flow-in passage 4a4. The first coolant temperature sensor 62 detects the temperature of the coolant that flows into the heater core 43. The controller 6 additionally includes a second coolant temperature sensor 63 provided in the condenser flow-in passage 4b1. The second coolant temperature sensor 63 detects the temperature of the coolant that flows into the condenser 22. The ECU 61 is connected to the sensors 62 and 63. Output signals from these sensors are input to the ECU 61.

The controller 6 additionally includes a cabin temperature sensor 66 that detects the temperature in the cabin of the vehicle 100, an outside air temperature sensor 67 that detects the temperature outside the cabin of the vehicle 100, and an operation panel 68 that is operated by a user. The ECU 61 is connected to these sensors and the operation panel 68. Output signals from these sensors and the operation panel 68 are input to the ECU 61.

The ECU 61 determines the presence or absence of a request for cooling, a request for heating, and a request for dehumidification based on the output signals from the sensors 66 and 67 and the operation panel 68. For example, the ECU 61 determines that heating is requested when the user turns on a switch for heating on the operation panel 68. When the user turns on an automatic (AUTO) switch on the operation panel 68, meanwhile, the ECU 61 determines that heating is requested when a cabin temperature set by the user is higher than the temperature detected by the cabin temperature sensor 66, for example.

Additionally, the ECU 61 is connected to various actuators of the in-vehicle temperature adjustment system to control the actuators. Specifically, the ECU 61 is connected to the compressor 21, the electromagnetic adjustment valves 28 and 29, the pumps 31, 41, and 51, the three-way valves 33, 34, 44, and 45, the blower motor 71a, the air mix door 72, and the fan 76 to control these components. Thus, the ECU 61 functions as a controller that controls the state of distribution of a heating medium (cooling medium and coolant) in the refrigeration circuit 2, the low-temperature circuit 3, and the high-temperature circuit 4 (including the engine thermal circuit 5).

Next, operation of the in-vehicle temperature adjustment system will be described. Next, the state of distribution of the heating medium (cooling medium and coolant) in the in-vehicle temperature adjustment system will be described with reference to FIGS. 5 to 11. In FIGS. 5 to 8 and 10, flow paths through which the cooling medium or the coolant flows are indicated by continuous lines, and flow paths through which no cooling medium or no coolant flows are indicated by dashed lines. Further, thin arrows in the drawings indicate the direction in which the cooling medium or the coolant flows, and thick arrows in the drawings indicate the direction in which heat is transferred.

Figure 5:
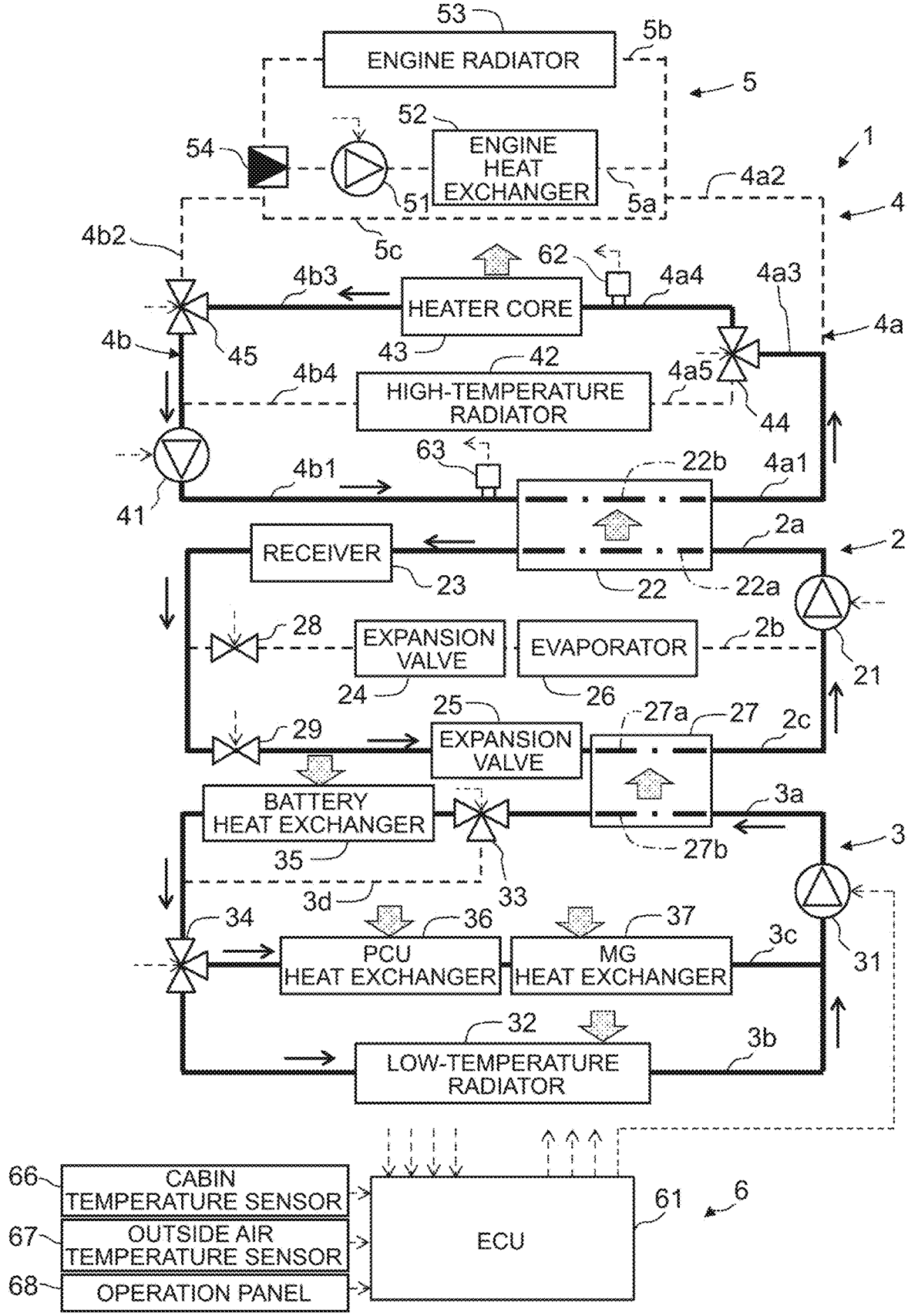
FIG. 5 illustrates a state of distribution (first heating mode) of a heating medium in the in-vehicle temperature adjustment system for a case where there is a request for heating and an internal combustion engine is stationary.

First, the state of distribution of a heating medium in a heating mode with a request for heating will be described. FIG. 5 illustrates a state of distribution (first heating mode) of the heating medium in the in-vehicle temperature adjustment system for a case where there is a request for heating and the internal combustion engine 110 is stopped. In the first heating mode, heating is performed by the heater core 43 using heat obtained from the refrigeration circuit 2.

In the first heating mode, as illustrated in FIG. 5, the compressor 21 of the refrigeration circuit 2 is activated, and the first electromagnetic adjustment valve 28 is closed and the second electromagnetic adjustment valve 29 is opened. Thus, the cooling medium is circulated through the chiller 27, rather than through the evaporator 26, in the refrigeration circuit 2.

In the first heating mode, in addition, the first pump 31 of the low-temperature circuit 3 is activated. In the first heating mode, in addition, the first three-way valve 33 is set such that the coolant is distributed to the batter heat exchanger 35, and the second three-way valve 34 is set such that the coolant is distributed to both the low-temperature radiator flow path 3b and the heat generation device flow path 3c. As a result, the coolant is circulated through the coolant piping 27b of the chiller 27, the low-temperature radiator 32, the battery heat exchanger 35, the PCU heat exchanger 36, and the MG heat exchanger 37 in the low-temperature circuit 3.

In the first heating mode, further, the second pump 41 of the high-temperature circuit 4 is activated. In the first heating mode, in addition, the third three-way valve 44 is set to the first state (FIG. 3A) such that the coolant flows into the heater core 43, and the fourth three-way valve 45 is set to the fourth state (FIG. 3D) such that the coolant flows into the condenser flow-in passage 4b1. As a result, the coolant is circulated through the heater core 43 and the coolant piping 22b of the condenser 22 in the high-temperature circuit 4.

In the first heating mode, from the above, heat is absorbed from the outside air or the heat generation devices in the low-temperature radiator 32 and transferred to the coolant in the low-temperature circuit 3, and heat is transferred from the coolant in the low-temperature circuit 3 to the cooling medium in the chiller 27. In the refrigeration circuit 2, heat is absorbed and transferred to the cooling medium in the chiller 27, and heat is transferred from the cooling medium in the condenser 22 to the coolant in the high-temperature circuit 4. Thus, the refrigeration circuit 2 functions as a heat pump that radiates heat which has been absorbed in the chiller 27 etc. from the condenser 22. In the high-temperature circuit 4, heat absorbed and transferred to the coolant in the condenser 22 is radiated from the heater core 43. Thus, in the first heating mode, heat is absorbed from the outside air or the heat generation devices in the low-temperature radiator 32, and radiated from the heater core 43.

Figure 6:
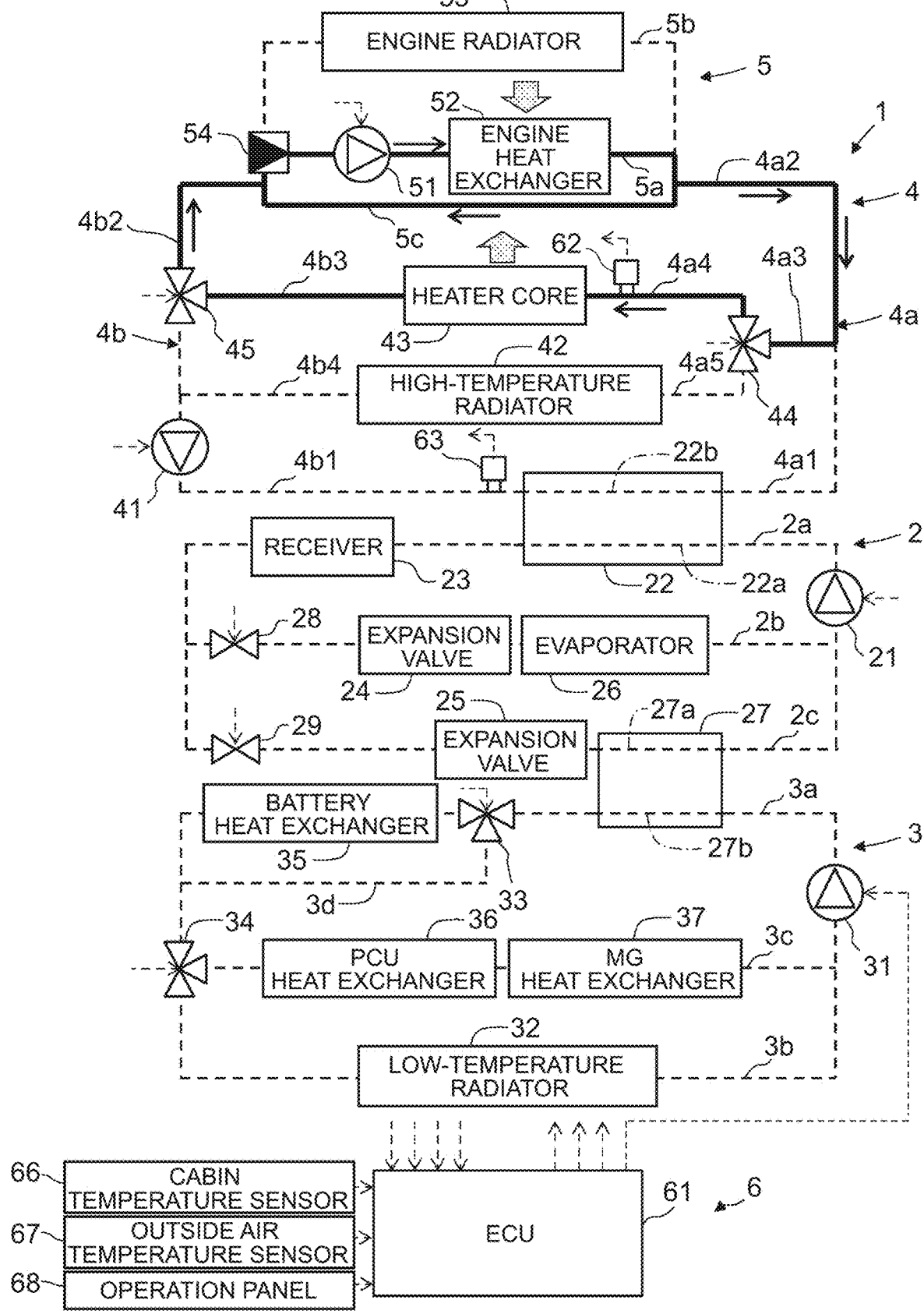
FIG. 6 illustrates a state of distribution (second heating mode) of the heating medium in the in-vehicle temperature adjustment system for a case where there is a request for heating and the internal combustion engine is operating.

FIG. 6 illustrates a state of distribution (second heating mode) of the heating medium in the in-vehicle temperature adjustment system for a case where there is a request for heating and the internal combustion engine 110 is operating. In the second heating mode, in particular, heating is performed by the heater core 43 using heat obtained from the internal combustion engine 110. In this case, the vehicle 100 is basically driven by the internal combustion engine 110. Therefore, the MG 112 etc. are not cooled in the example illustrated in FIG. 6.

In the second heating mode, as illustrated in FIG. 6, the compressor 21 of the refrigeration circuit 2 and the first pump 31 are stopped. Thus, the cooling medium is not circulated in the refrigeration circuit 2, and the coolant is not circulated in the low-temperature circuit 3.

In the second heating mode, in addition, the second pump 41 of the high-temperature circuit 4 is stopped, and the third pump 51 of the engine thermal circuit 5 is activated. The third three-way valve 44 is set to the first state (FIG. 3A) such that the coolant flows into the heater core 43, and the fourth three-way valve 45 is set to the first state (FIG. 3A) such that the coolant flows into the engine thermal circuit 5. As a result, the coolant is circulated through the engine thermal circuit 5 and the heater core 43 by the third pump 51 in the high-temperature circuit 4. As a result, in the second heating mode, heat is absorbed from the internal combustion engine 110 in the engine heat exchanger 52, and the heat is radiated from the heater core 43. Note that, while the coolant does not flow through the engine radiator flow path 5b in the example illustrated in FIG. 6, the thermostat 54 is opened in accordance with the temperature of the coolant in the engine thermal circuit 5 such that the coolant also flows through the engine radiator flow path 5b.

Figure 7:
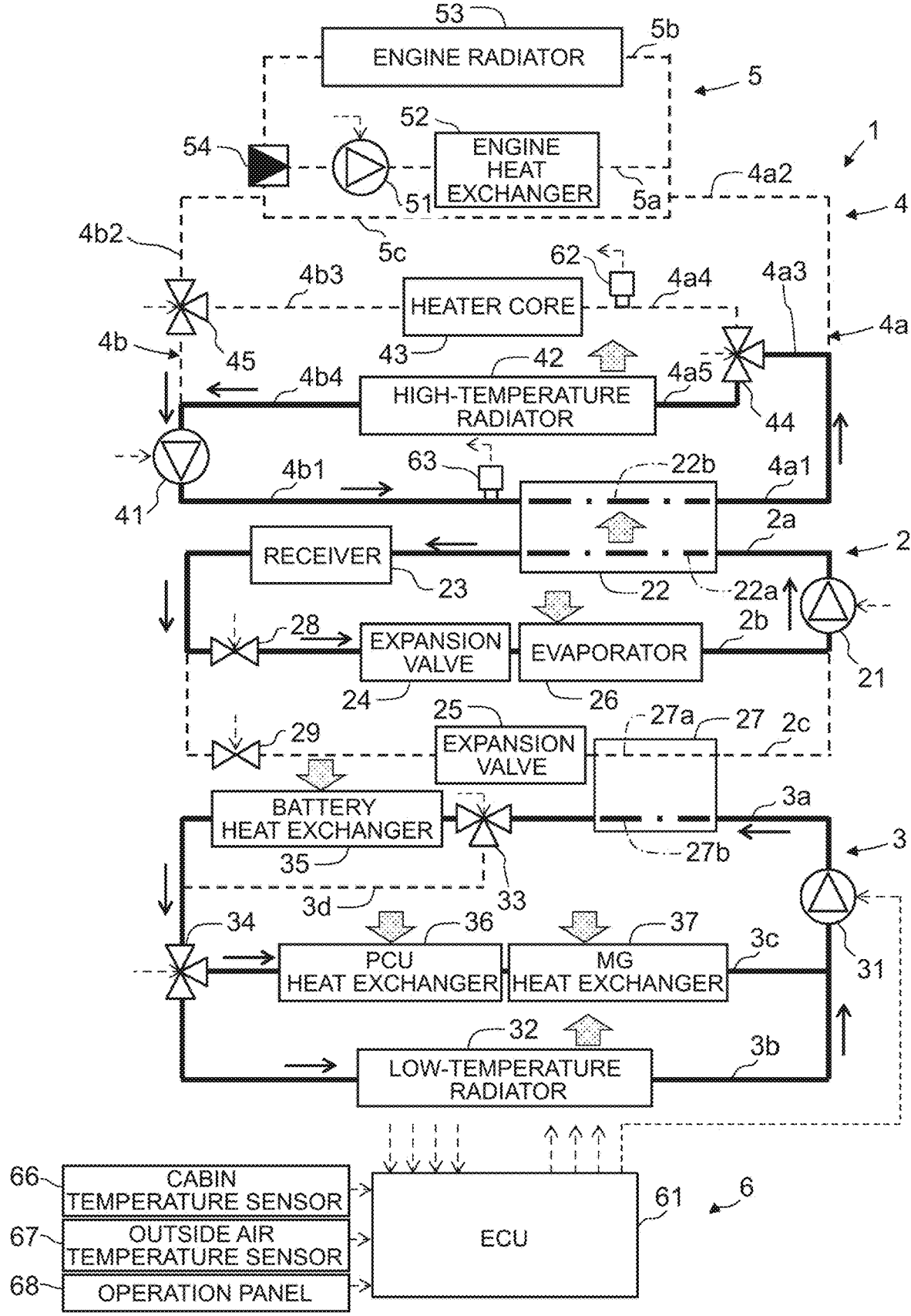
FIG. 7 illustrates a state of distribution (cooling mode) of the heating medium in the in-vehicle temperature adjustment system for a case where there is a request for cooling.

Next, the state of distribution of a heating medium in a cooling mode with a request for cooling will be described. FIG. 7 illustrates a state of distribution (cooling mode) of the heating medium in the in-vehicle temperature adjustment system for a case where there is a request for cooling. While the internal combustion engine 110 is stopped in the example illustrated in FIG. 7, the coolant is circulated in the engine thermal circuit 5 when the internal combustion engine 110 is operating.

In the cooling mode, as illustrated in FIG. 7, the compressor 21 of the refrigeration circuit 2 is activated, and the first electromagnetic adjustment valve 28 is opened and the second electromagnetic adjustment valve 29 is closed. Thus, the cooling medium is circulated through the evaporator 26, rather than through the chiller 27, in the refrigeration circuit 2. Note that, in the cooling mode, the cooling medium may also be distributed to the chiller 27 by opening the second electromagnetic adjustment valve 29, in order to promote cooling of the heat generation devices.

Further, in the cooling mode, in addition, the first pump 31 of the low-temperature circuit 3 is activated. In addition, the first three-way valve 33 is set such that the coolant is distributed to the battery heat exchanger 35, and the second three-way valve 34 is set such that the coolant is distributed to both the low-temperature radiator flow path 3b and the heat generation device flow path 3c. As a result, the coolant is circulated through the coolant piping 27b of the chiller 27, the low-temperature radiator 32, the battery heat exchanger 35, the PCU heat exchanger 36, and the MG heat exchanger 37 in the low-temperature circuit 3. Consequently, heat is absorbed from the heat generation devices and transferred to the coolant, and the heat is radiated from the low-temperature radiator 32 to the atmosphere.

In the cooling mode, from the above, heat is absorbed from the ambient air in the evaporator 26 and transferred to the cooling medium in the refrigeration circuit 2, and the heat is transferred from the cooling medium in the condenser 22 to the coolant in the high-temperature circuit 4. In the high-temperature circuit 4, heat absorbed and transferred to the coolant in the condenser 22 is radiated from the high-temperature radiator 42. Thus, in the cooling mode, heat is absorbed from the ambient air that passes through the air passage 7 in the evaporator 26 to cool the vehicle cabin, and the heat is radiated from the high-temperature radiator 42.

Next, the state of distribution of a heating medium in a heating and dehumidification mode with a request for heating with dehumidification will be described. In the heating with dehumidification, air that passes through the air passage 7 is temporarily cooled in the evaporator 26. At this time, the amount of saturated water vapor is decreased as the temperature of the air is lowered, which causes a part of water vapor in the air to be condensed and results in dehumidification. After that, the vehicle cabin is heated by heating the air using the heater core 43. The amount of heat required for the heater core 43 to warm air is basically larger than the amount of heat absorbed from air in the evaporator 26. Therefore, to perform heating with dehumidification, it is necessary to heat the coolant in the high-temperature circuit 4 by causing the internal combustion engine 110 to operate.

Figure 8:
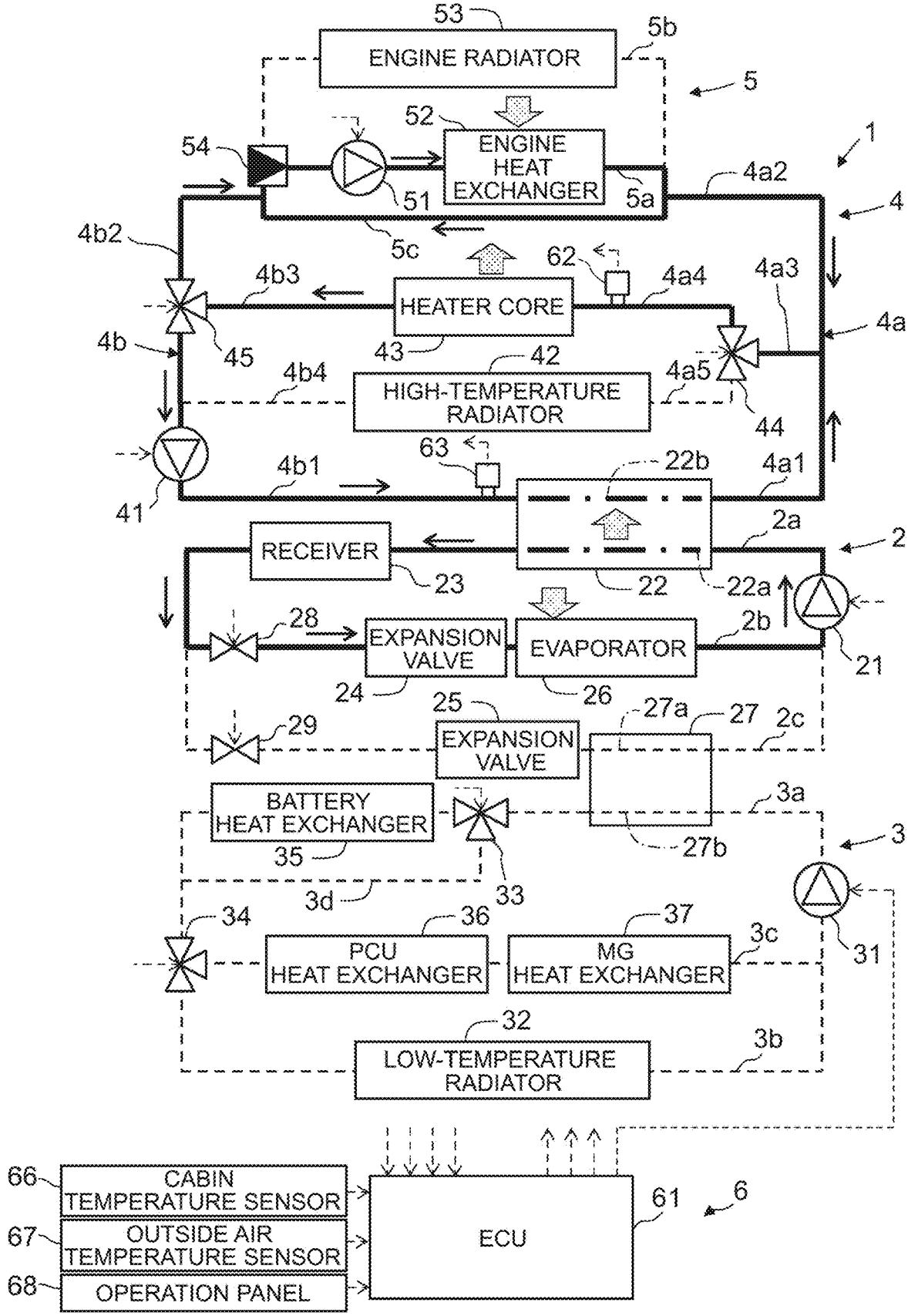
FIG. 8 illustrates a slate of distribution (first heating and dehumidification mode) of the heating medium in the in-vehicle temperature adjustment system for a case where there is a request for heating with dehumidification and the temperature of a coolant that flows into a heater core is not unnecessarily high.

FIG. 8 illustrates the state of distribution (first heating and dehumidification mode) of the heating medium in the in-vehicle temperature adjustment system for a case where there is a request for heating with dehumidification and the temperature of the coolant that flows into the heater core 43 is not unnecessarily high (e.g. is less than 45° C.). In this case, the vehicle 100 is basically driven by the internal combustion engine 110. Therefore, the MG 112 etc. are not cooled in the example illustrated in FIG. 6.

In a first heating and dehumidification mode, as illustrated in FIG. 8, the compressor 21 of the refrigeration circuit 2 is activated, and the first electromagnetic adjustment valve 28 is opened and the second electromagnetic adjustment valve 29 is closed. Thus, the cooling medium is circulated through the evaporator 26, rather than through the chiller 27, in the refrigeration circuit 2. In the first heating and dehumidification mode, in addition, the first pump 31 of the low-temperature circuit 3 is stopped, and hence the coolant is not circulated in the low-temperature circuit 3. When the vehicle 100 is also driven by the MG 112, the coolant in the low-temperature circuit 3 may be circulated, as in the cooling mode illustrated in FIG. 7. In the first heating and dehumidification mode, additionally, the third pump 51 of the engine thermal circuit 5 is activated. Thus, the coolant is circulated in the engine thermal circuit 5.

In the first heating and dehumidification mode, in addition, the second pump 41 of the high-temperature circuit 4 is activated. In the first heating and dehumidification mode, further, the third three-way valve 44 is set to the first state (FIG. 3A) such that the coolant flows into the heater core 43, and the fourth three-way valve 45 is set to the second state (FIG. 3B) or the third state (FIG. 3C) such that the coolant flows into both the condenser flow-in passage 4b1 and the engine flow-in passage 4b2. As a result, in the high-temperature circuit 4, the coolant is circulated through the heater core 43, rather than through the high-temperature radiator 42, and circulated through both the condenser 22 and the engine thermal circuit 5.

Figure 9:
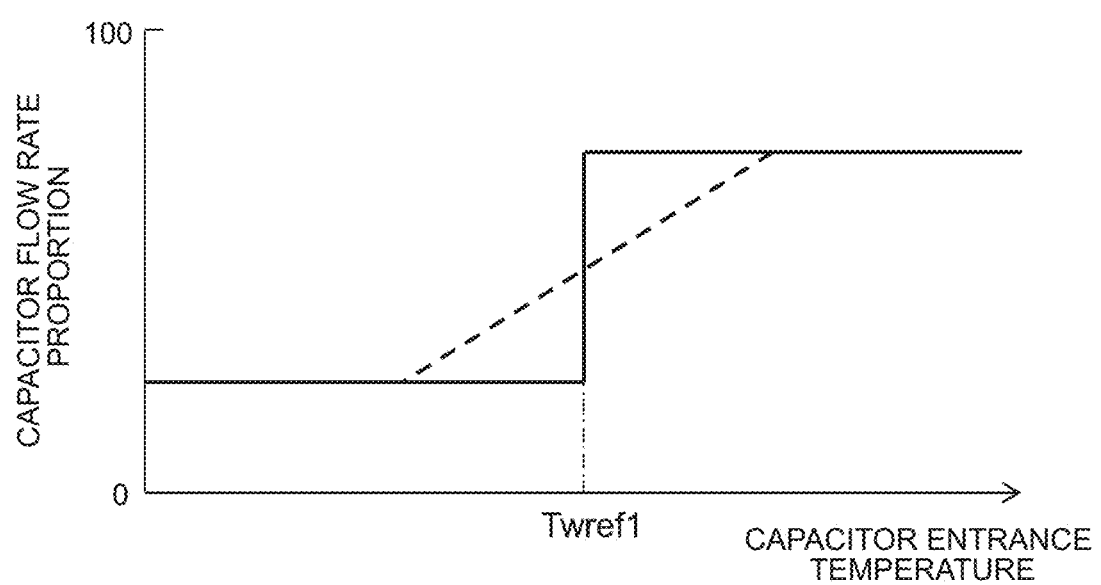
FIG. 9 illustrates the temperature of a coolant that flows into a condenser and the proportion of the flow rate of a coolant that flows into a condenser flow-in passage to the flow rate of a coolant that flows into the fourth three-way valve.

In the present embodiment, in particular, the operation state of the fourth three-way valve 45 is switched in accordance with the temperature of the coolant that flows into the condenser 22. FIG. 9 illustrates the temperature (condenser entrance temperature) of the coolant that flows into the condenser 22 and the proportion (hereinafter referred to as "condenser flow rate proportion") of the flow rate of the coolant that flows into the condenser flow-in passage 4b1 to the flow rate of the coolant that flows into the fourth three-way valve 45. As indicated by the continuous line in FIG. 9, when the condenser entrance temperature is lower than a first reference temperature Twref1 (e.g. 45° C.), the fourth three-way valve 45 is set to the second state, and hence the condenser flow rate proportion is low. When the condenser entrance temperature is equal to or more than the first reference temperature Twref1, on the other hand, the fourth three-way valve 45 is set to the third state, and hence the condenser flow rate proportion is high.

The continuous line in FIG. 9 indicates the relationship for a case where the fourth three-way valve 45 is switchable in four steps as illustrated in FIGS. 3A to 3D. When the fourth three-way valve 45 is an adjustment valve that can adjust the flow rate in more than four steps or continuously, on the other hand, the adjustment valve is controlled such that the condenser flow rate proportion becomes higher as the condenser entrance temperature becomes higher as indicated by the dashed line in FIG. 9.

In the first heating and dehumidification mode, from the above, the third three-way valve 44 is controlled such that the coolant that has flowed from the merging passage 4a3 into the third three-way valve 44 flows into the heater core 43, rather than flowing into the high-temperature radiator 42. In the first heating and dehumidification mode in which the third three-way valve 44 is controlled in this manner, additionally, the fourth three-way valve 45 is controlled such that the coolant that has flowed from the core flow-out passage 4b3 into the fourth three-way valve 45 flows into both the condenser 22 and the engine thermal circuit 5. In the present embodiment, in particular, the fourth three-way valve 45 is controlled such that the flow rate of the coolant that flows into the condenser 22 is high for the flow rate of the coolant that flows into the engine thermal circuit 5 when the condenser entrance temperature is high, compared to when the condenser entrance temperature is low.

In order to enhance the effect of cooling air in the evaporator 26 when performing heating with dehumidification, it is necessary to sufficiently transfer heat from the cooling medium to the coolant in the condenser 22. To this end, the temperature of the coolant that flows into the condenser 22 is preferably controlled so as to be low.

When all the coolant that has flowed into the third three-way valve 44 flows into the heater core 43 as in the first heating and dehumidification mode, on the other hand, the temperature of the coolant that flows into the condenser 22 is controlled by the fourth three-way valve 45. In particular, when the proportion of the coolant that flows from the fourth three-way valve 45 into the engine thermal circuit 5 is increased, the temperature of the coolant that flows into the heater core 43 is raised, which results in a rise in the temperature of the coolant that flows out of the heater core 43 and a rise in the temperature of the coolant that flows into the condenser 22. When the proportion of the coolant that flows from the fourth three-way valve 45 into the condenser 22 is increased, conversely, the temperature of the coolant that flows into the condenser 22 is lowered. Thus, according to the present embodiment, it is possible to perform heating with dehumidification while maintaining a high cooling effect, by appropriately controlling the temperature of the coolant that flows into the condenser 22.

Figure 10:
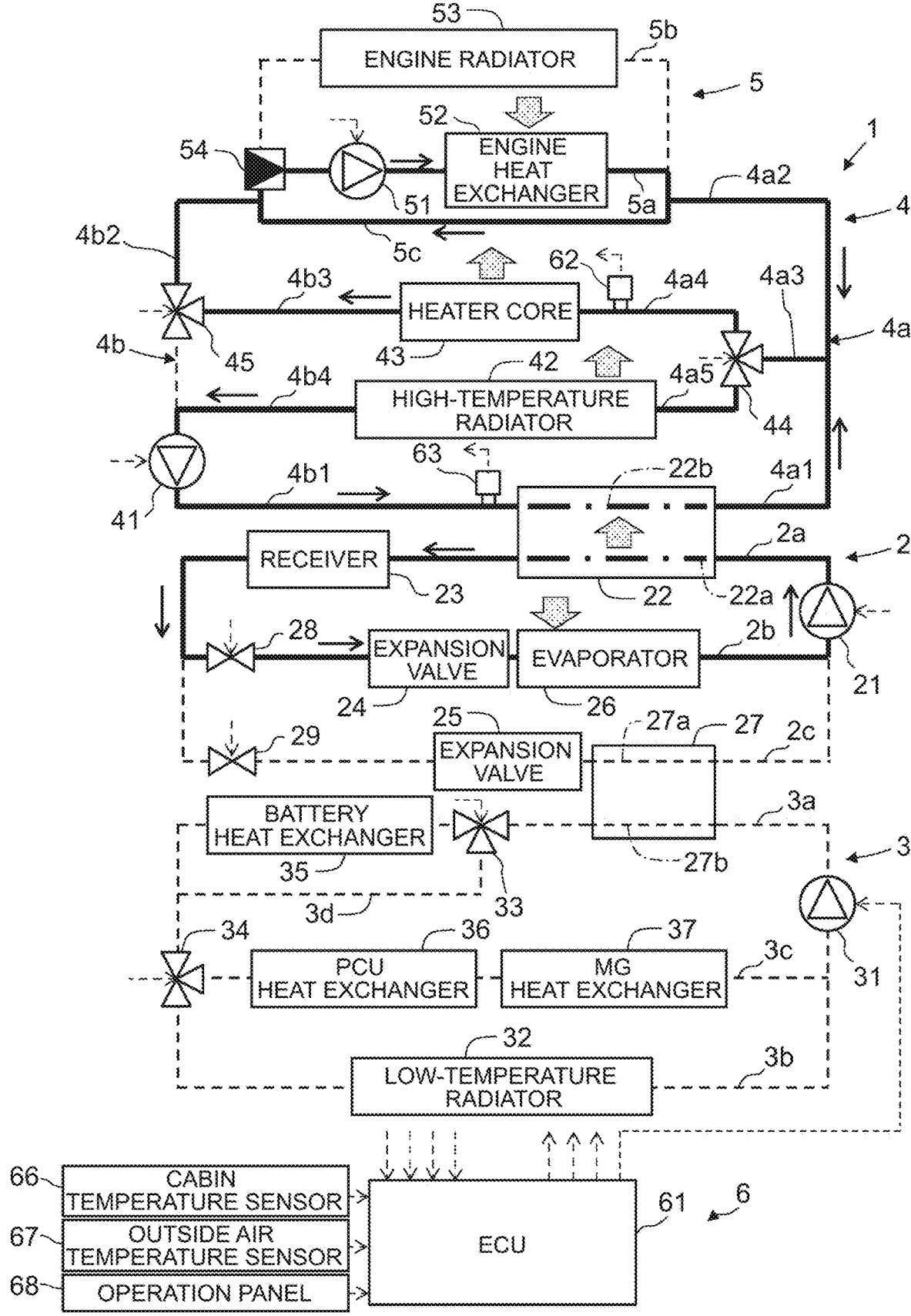
FIG. 10 illustrates a state of distribution (second heating and dehumidification mode) of the heating medium in the in-vehicle temperature adjustment system for a case where there is a request for heating with dehumidification and the temperature of the coolant that flows into the heater core is unnecessarily high.

FIG. 10 illustrates the state of distribution (second heating and dehumidification mode) of the heating medium in the in-vehicle temperature adjustment system for a case where there is a request for heating with dehumidification and the temperature of the coolant that flows into the heater core 43 is unnecessarily high (e.g. is equal to or more than 45° C.). While the MG 112 etc. are not cooled also in the example illustrated in FIG. 10, the coolant in the low-temperature circuit 3 may be circulated as in the cooling mode illustrated in FIG. 7, in order to cool the MG 112 etc.

In a second heating and dehumidification mode, as illustrated in FIG. 10, the compressor 21 of the refrigeration circuit 2 is activated, and the first electromagnetic adjustment valve 28 is opened and the second electromagnetic adjustment valve 29 is closed, as in the first heating and dehumidification mode. Thus, the cooling medium is circulated through the evaporator 26, rather than through the chiller 27, in the refrigeration circuit 2. In the second heating and dehumidification mode, additionally, the third pump 51 of the engine thermal circuit 5 is activated. Thus, the coolant is circulated in the engine thermal circuit 5.

Further, in the second heating and dehumidification mode, in addition, the second pump 41 of the high-temperature circuit 4 is activated. In the second heating and dehumidification mode, further, the third three-way valve 44 is set to the second state (FIG. 3B) or the third state (FIG. 3C) such that the coolant flows into both the heater core 43 and the high-temperature radiator 42. The fourth three-way valve 45 is set to the first state (FIG. 3A) such that the coolant that has flowed out of the heater core 43 flows into the engine flow-in passage 4b2. As a result, in the high-temperature circuit 4, the coolant is circulated through both the heater core 43 and the high-temperature radiator 42, and circulated such that the coolant that has flowed out of the heater core 43 passes through the engine thermal circuit 5 and the coolant that has flowed out of the high-temperature radiator 42 passes through the condenser 22.

Figure 11:
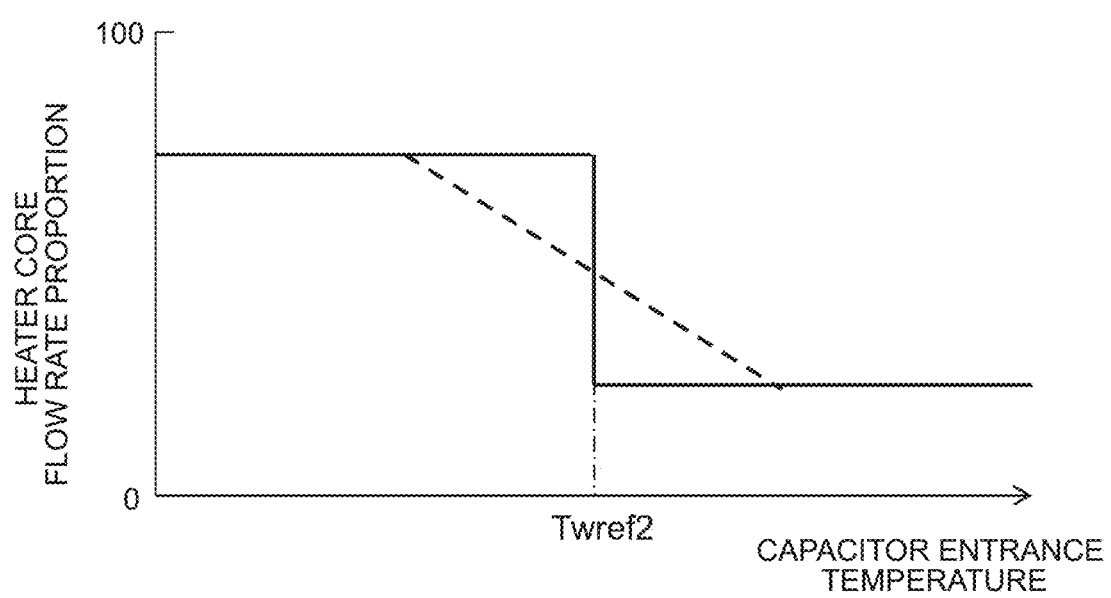
FIG. 11 illustrates the temperature of the coolant that flows into the condenser and the proportion of the flow rate of a coolant that flows into a core flow-in passage to the flow rate of a coolant that flows into a third three-way valve illustrated in FIG. 2.

In the present embodiment, in particular, the operation state of the third three-way valve 44 is switched in accordance with the temperature of the coolant that flows into the condenser 22. FIG. 11 illustrates the temperature (condenser entrance temperature) of the coolant that flows into the condenser 22 and the proportion (hereinafter referred to as "heater core flow rate proportion") of the flow rate of the coolant that flows into the core flow-in passage 4a4 to the flow rate of the coolant that flows into the third three-way valve 44. As indicated by the continuous line in FIG. 11, when the condenser entrance temperature is lower than a second reference temperature Twref2 (e.g. 45° C.), the third three-way valve 44 is set to the second state, and hence the heater core flow rate proportion is high. When the condenser entrance temperature is equal to or more than the second reference temperature Twref2, on the other hand, the third three-way valve 44 is set to the third state, and hence the heater core flow rate proportion is low.

Note that, the continuous line in FIG. 11 indicates the relationship fix a case where the third three-way valve 44 is switchable in four steps as illustrated in FIGS. 3A to 3D. When the third three-way valve 44 is an adjustment valve that can adjust the flow rate in more than four steps or continuously, on the other hand, the adjustment valve is controlled such that the heater core flow rate proportion becomes lower as the condenser entrance temperature becomes higher as indicated by the dashed line in FIG. 11.

In the second heating and dehumidification mode, from the above, the third three-way valve 44 is controlled such that the coolant that has flowed from the merging passage 4a3 into the third three-way valve 44 flows into both the heater core 43 and the high-temperature radiator 42. In the second heating and dehumidification mode in which the third three-way valve 44 is controlled in this manner, additionally, the fourth three-way valve 45 is controlled such that the coolant that has flowed from the core flow-out passage 4b3 into the fourth three-way valve 45 flows into the engine thermal circuit 5, rather than flowing into the condenser 22.

In the present embodiment, in particular, the third three-way valve 44 is controlled such that the flow rate of the coolant that flows into the heater core 43 is low for the flow rate of the coolant that flows into the high-temperature radiator 42 when the condenser entrance temperature is high, compared to when the condenser entrance temperature is low.

When the coolant that has flowed into the third three-way valve 44 flows into both the heater core 43 and the high-temperature radiator 42 as in the second heating and dehumidification mode, the temperature of the coolant that flows into the condenser 22 is controlled by the third three-way valve 44. In particular, when the proportion of the coolant that flows from the third three-way valve 44 into the heater core 43 is increased, the proportion of the coolant that flows into the engine thermal circuit 5 is increased. As a result, the temperature of the coolant that flows into the merging passage 4a3 is raised, and the temperature of the coolant that flows into the condenser 22 via the high-temperature radiator 42 is raised. When the proportion of the coolant that flows from the third three-way valve 44 into the high-temperature radiator 42 is increased, conversely, the temperature of the coolant that flows into the condenser 22 is lowered. Thus, with the present embodiment, it is possible to perform heating with dehumidification while maintaining a high cooling effect, by appropriately controlling the temperature of the coolant that flows into the condenser 22.

In the present embodiment, in addition, when heating with dehumidification is performed in the vehicle cabin, the third three-way valve 44 is controlled such that the coolant flows into the heater core 43, rather than flowing into the high-temperature radiator 42, when the temperature of the coolant that flows into the heater core 43 is low. On the other hand, the third three-way valve 44 is controlled such that the coolant flows into both the heater core 43 and the high-temperature radiator 42 when the temperature of the coolant that flows into the heater core 43 is high. As a result, a part of the coolant flows into the condenser 22 via the high-temperature radiator 42 when the temperature of the coolant that flows into the heater core 43 is high, as a result of which the temperature of the coolant that flows into the condenser 22 can be maintained at a low level. On the other hand, the coolant does not flow into the high-temperature radiator 42 when the temperature of the coolant that flows into the heater core 43 is low, which suppresses radiation of heat from the high-temperature radiator 42 to the outside air, and hence suppresses the temperature of the coolant that flows into the heater core 43 being lowered excessively. Thus, also with such a feature, it is possible to perform heating with dehumidification while maintaining a high cooling effect, by appropriately controlling the temperature of the coolant that flows into the condenser 22.

In the present embodiment, from the above, the third three-way valve 44 and the fourth three-way valve 45 are controlled based on the temperature of the coolant that flows into the heater core 43 and the temperature of the coolant that flows into the condenser 22 when heating with dehumidification is performed in the vehicle cabin. As a result, with the present embodiment, it is possible to perform heating with dehumidification while maintaining a high cooling effect, by appropriately controlling the temperature of the coolant that flows into the condenser 22.

Next, control for the third three-way valve and the fourth three-way valve will be described.

Figure 12:
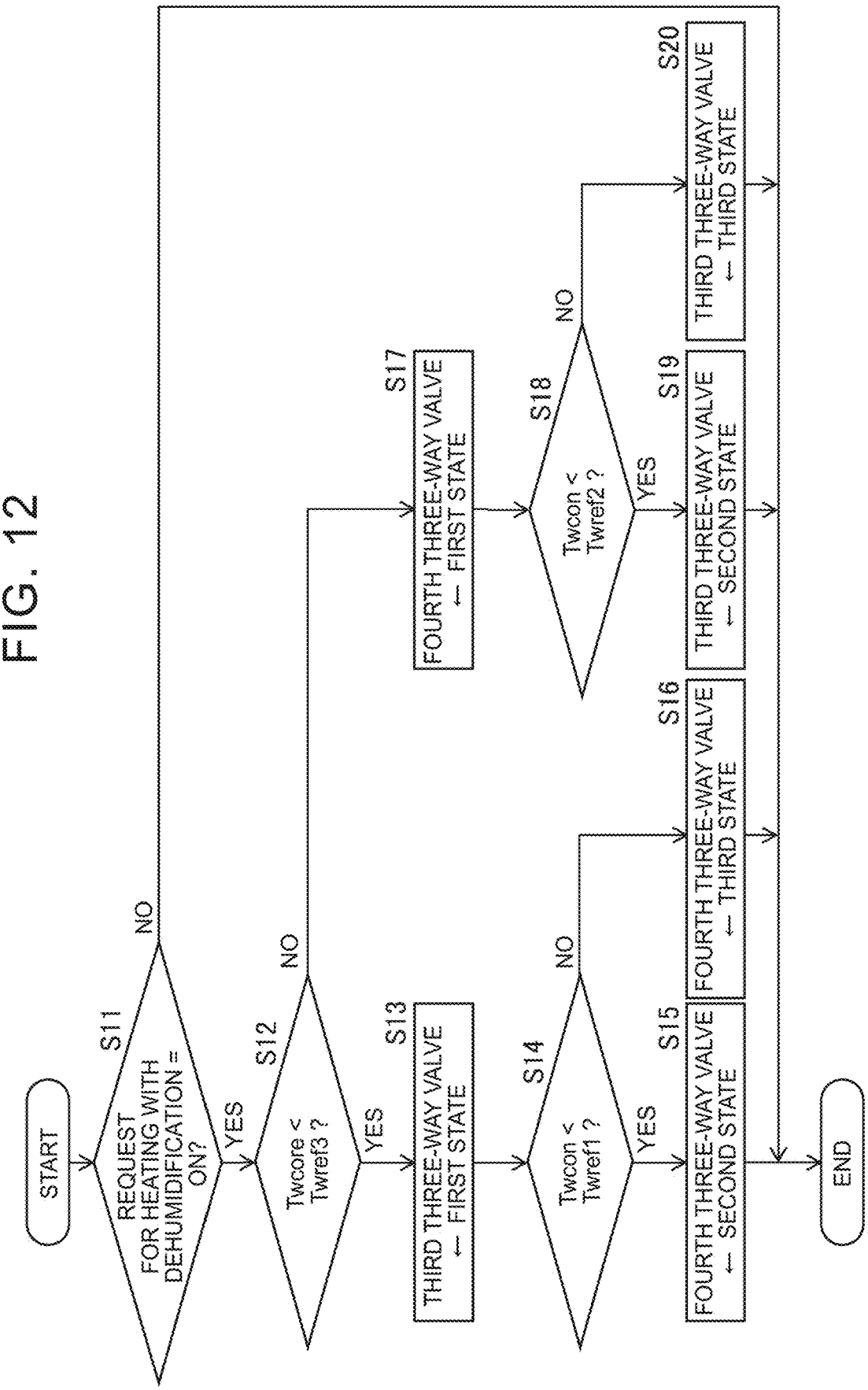
FIG. 12 is a flowchart illustrating the flow of a process of switching the third three-way valve and the fourth three-way valve at the time when there is a request for heating with dehumidification.

As discussed above, the third three-way valve 44 and the fourth three-way valve 45 are controlled by the ECU 61. When there is a request for heating with dehumidification, the ECU 61 basically activates the internal combustion engine 110, and activates the compressor 21 to circulate the cooling medium in the refrigeration circuit 2. Control for switching the third three-way valve 44 and the fourth three-way valve 45 at the time when there is a request for heating with dehumidification will be described below with reference to FIG. 12. FIG. 12 is a flowchart illustrating the flow of a process of switching the third three-way valve 44 and the fourth three-way valve 45 at the time when there is a request for heating with dehumidification. The illustrated switching process is executed at constant time intervals.

First, the ECU 61 determines whether there is a request for heating with dehumidification (step S11). When it is determined in step S11 that there is no request for heating with dehumidification, a process of switching the third three-way valve 44 and the fourth three-way valve 45 at the time when there is no request for heating with dehumidification, which is different from the flowchart illustrated in FIG. 12, is executed.

When it is determined in step S11 that there is a request for heating with dehumidification, the ECU 61 determines whether a temperature Twcore of the coolant that flows into the heater core 43 is less than a third reference temperature Twref3 (e.g. 45° C.). The temperature Twcore of the coolant that flows into the heater core 43 is detected by the first coolant temperature sensor 62.

When it is determined in step S12 that the temperature Twcore of the coolant that flows into the heater core 43 is less than the third reference temperature Twref3, the ECU 61 sets the operation state of the third three-way valve 44 to the first state (step S13), in order to set the operation mode of the in-vehicle temperature adjustment system to the first heating and dehumidification mode.

Then, the ECU 61 determines whether the temperature Twcon of the coolant that flows into the condenser 22 is less than the first reference temperature Twref1 (step S14). The temperature Twcon of the coolant that flows into the condenser 22 is detected by the second coolant temperature sensor 63. When it is determined in step S14 that the temperature Twcon of the coolant is less than the first reference temperature Twref1, the fourth three-way valve 45 is set to the second state (step S15). When it is determined in step S14 that the temperature Twcon of the coolant is not less than the first reference temperature Twref1, on the other hand, the fourth three-way valve 45 is set to the second state (step S16).

When it is determined in step S12 that the temperature Twcore of the coolant that flows into the heater core 43 is not less than the third reference temperature Twref3, on the other hand, the ECU 61 sets the operation state of the fourth three-way valve 45 to the first state (step S17), in order to set the operation mode of the in-vehicle temperature adjustment system to the second heating and dehumidification mode.

Then, the ECU 61 determines whether the temperature Twcon of the coolant that flows into the condenser 22 is less than the second reference temperature Twref2 (step S18). When it is determined in step S18 that the temperature Twcon of the coolant is less than the second reference temperature Twref2, the third three-way valve 44 is set to the second state (step S19). When it is determined in step S18 that the temperature Twcon of the coolant is not less than the second reference temperature Twref2, on the other hand, the third three-way valve 44 is set to the third state (step S20).

While an embodiment and modifications have been described above by way of example, the present disclosure is not limited to the embodiment, and may be modified and changed in various ways without departing from the scope of the claims.

What is claimed is:

1. An in-vehicle temperature adjustment system, comprising:
   a refrigeration circuit including an inter-medium heat exchanger that is configured to radiate heat from a cooling medium to a heating medium to condense the cooling medium and a vaporizer that is configured to cause the cooling medium to absorb heat from air to be supplied to a vehicle cabin to vaporize the cooling medium, the refrigeration circuit being configured to achieve a refrigeration cycle by circulating the cooling medium through the inter-medium heat exchanger and the vaporizer;
   a thermal circuit including a heater core that is used to heat the vehicle cabin, the inter-medium heat exchanger, an engine thermal circuit, and a radiator that is configured to radiate heat to outside air to cool the heating medium, the thermal circuit being configured to circulate the heating medium through the heater core, the inter-medium heat exchanger, the engine thermal circuit, and the radiator; and
   a controller configured to control a state of distribution of the heating medium in the thermal circuit, wherein:
   the engine thermal circuit is configured to distribute the heating medium through an engine heat exchanger that exchanges heat with an internal combustion engine, rather than through the heater core and the inter-medium heat exchanger;
   the thermal circuit includes a first branch portion, a second branch portion, a first adjustment valve, and a second adjustment valve, the first branch portion including a merging portion at which the heating medium that has flowed out of the engine thermal circuit and the heating medium that has flowed out of the inter-medium heat exchanger are merged, the first branch portion being a portion at which the heating medium merged at the merging portion is divided into the heating medium to flow into the heater core and the heating medium to flow into the radiator, the second branch portion including a portion at which the heating medium that has flowed out of the heater core is divided into the heating medium to flow into the inter-medium heat exchanger and the heating medium to flow into the engine thermal circuit, the first adjustment valve being configured to adjust a proportion of a flow rate of the heating medium that flows from the first branch portion into the heater core and a flow rate of the heating medium that flows from the first branch portion into the radiator, and the second adjustment valve being configured to adjust a proportion of a flow rate of the heating medium that flows from the second branch portion into the inter-medium heat exchanger and a flow rate of the heating medium that flows from the second branch portion into the engine thermal circuit; and
   the controller is configured to control the first adjustment valve and the second adjustment valve.

2. The in-vehicle temperature adjustment system according to claim 1, wherein the first adjustment valve is configured to switch the flow rate in four steps.

3. The in-vehicle temperature adjustment system according to claim 1, wherein the first adjustment valve is configured to adjust the flow rate in more than four steps or continuously.

4. The in-vehicle temperature adjustment system according to claim 1, wherein the controller is configured to control the first adjustment valve and the second adjustment valve based on a temperature of the heating medium that flows into the heater core and a temperature of the heating medium that flows into the inter-medium heat exchanger when heating with dehumidification is performed in the vehicle cabin.

5. The in-vehicle temperature adjustment system according to claim 4, wherein:
   the controller is configured to control the first adjustment valve such that the heating medium that has flowed into the first branch portion flows into the heater core, rather than flowing into the radiator, when the heating with dehumidification is performed in the vehicle cabin and the temperature of the heating medium that flows into the heater core is less than a predetermined reference temperature; and
   the controller is configured to control the first adjustment valve such that the heating medium that has flowed into the first branch portion flows into both the heater core and the radiator when the temperature of the heating medium that flows into the heater core is equal to or higher than the reference temperature.

6. The in-vehicle temperature adjustment system according to claim 4, wherein the controller is configured to control the second adjustment valve such that the heating medium that has flowed into the second branch portion flows into both the inter-medium heat exchanger and the engine thermal circuit when the heating with dehumidification is performed in the vehicle cabin and the first adjustment valve is controlled such that the heating medium that has flowed into the first branch portion flows into the heater core, rather than flowing into the radiator.

7. The in-vehicle temperature adjustment system according to claim 6, wherein the controller is configured to control the second adjustment valve such that a flow rate of the heating medium that flows into the inter-medium heat exchanger is high for a flow rate of the heating medium that flows into the engine thermal circuit when the temperature of the heating medium that flows into the inter-medium heat exchanger is high, compared to when the temperature of the heating medium that flows into the inter-medium heat exchanger is low, when the heating with dehumidification is performed in the vehicle cabin and the first adjustment valve is controlled such that the heating medium that has flowed into the first branch portion flows into the heater core, rather than flowing into the radiator.

8. The in-vehicle temperature adjustment system according to claim 4, wherein the controller is configured to control the second adjustment valve such that the heating medium that has flowed into the second branch portion flows into the engine thermal circuit, rather than flowing into the inter-medium heat exchanger, when cooling with dehumidification is performed in the vehicle cabin and the first adjustment valve is controlled such that the heating medium that has flowed into the first branch portion flows into both the heater core and the radiator.

9. The in-vehicle temperature adjustment system according to claim 8, wherein the controller is configured to control the first adjustment valve such that the flow rate of the heating medium that flows into the heater core is low for the flow rate of the heating medium that flows into the radiator when the temperature of the heating medium that flows into the inter-medium heat exchanger is high, compared to when the temperature of the heating medium that flows into the inter-medium heat exchanger is low, when the cooling with dehumidification is performed in the vehicle cabin and the first adjustment valve is controlled such that the heating medium that has flowed into the first branch portion flows into both the heater core and the radiator.

* * * * *